(12) United States Patent
Choudhuri et al.

(10) Patent No.: US 11,010,921 B2
(45) Date of Patent: May 18, 2021

(54) DISTRIBUTED POSE ESTIMATION

(71) Applicant: QUALCOMM Incorporated, San Diego, CA (US)

(72) Inventors: Chiranjib Choudhuri, Bangalore (IN); Pushkar Gorur Sheshagiri, Bengaluru (IN); Ajit Deepak Gupte, Bangalore (IN); Vinay Melkote Krishnaprasad, Bangalore (IN); Chayan Sharma, Jabalpur (IN); Ajit Venkat Rao, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 16/414,664

(22) Filed: May 16, 2019

(65) Prior Publication Data

US 2020/0364901 A1 Nov. 19, 2020

(51) Int. Cl.

| | |
|---|---|
| *G06T 7/73* | (2017.01) |
| *G06F 3/00* | (2006.01) |
| *G06T 19/00* | (2011.01) |
| *G02B 27/01* | (2006.01) |
| *G06F 3/01* | (2006.01) |

(52) U.S. Cl.
CPC .............. *G06T 7/75* (2017.01); *G02B 27/017* (2013.01); *G02B 27/0179* (2013.01); *G06F 3/005* (2013.01); *G06F 3/012* (2013.01); *G06T 19/006* (2013.01); *G02B 2027/0187* (2013.01); *G06T 2207/30244* (2013.01)

(58) Field of Classification Search
CPC .................... G06T 7/75; G06T 19/006; G06T 2207/30244; G02B 27/017; G02B 27/0179; G02B 2027/0187
See application file for complete search history.

(56) References Cited

U.S. PATENT DOCUMENTS

| | | | |
|---|---|---|---|
| 9,063,330 B2 | 6/2015 | Lavalle et al. | |
| 9,240,069 B1 | 1/2016 | Li | |
| 2012/0300020 A1 | 11/2012 | Arth et al. | |
| 2012/0306850 A1 | 12/2012 | Balan et al. | |
| 2015/0029218 A1 | 1/2015 | Williams et al. | |
| 2017/0018121 A1 | 1/2017 | Lawson et al. | |
| 2017/0115488 A1* | 4/2017 | Ambrus | G06T 11/60 |

OTHER PUBLICATIONS

International Search Report and Written Opinion—PCT/US2020/032756—ISA/EPO—dated Jul. 17, 2020.

* cited by examiner

*Primary Examiner* — Utpal D Shah
(74) *Attorney, Agent, or Firm* — QUALCOMM Incorporated

(57) ABSTRACT

Systems, methods, and computer-readable media are provided for distributed tracking and mapping for extended reality experiences. An example method can include computing, at a device, a pose of the device at a future time, the future time being determined based on a communication latency between the device and a mapping backend system; sending, to the mapping backend system, the pose of the device; receiving, from the mapping backend system, a map slice including map points corresponding to a scene associated with the device, the map slice being generated based on the pose of the device, wherein the map points correspond to the predicted pose; and computing an updated pose of the device based on the map slice.

30 Claims, 10 Drawing Sheets

DISTRIBUTED POSE ESTIMATION

TECHNICAL FIELD

The present disclosure generally relates to pose estimation technologies.

BACKGROUND

Pose estimation can be used in various applications, such as computer vision and robotics, to determine the position and orientation of a human or object relative to a scene or environment. This pose information can be used to manage interactions between a human or object and a specific scene or environment. For example, the pose (e.g., position and orientation) of a robot can be used to allow the robot to manipulate an object or avoid colliding with an object when moving about a scene. As another example, the pose of a user or a device worn by the user can be used to enhance or augment the user's real or physical environment with virtual content. However, the computational complexity of pose estimation systems can impose significant power and resource demands, and can be a limiting factor in various applications. The computational complexity of pose estimation can also limit the performance and scalability of tracking and localization applications that rely on pose information.

BRIEF SUMMARY

In some examples, systems, methods, and computer-readable media are described for providing split tracking, mapping and pose prediction. As noted above, the computational complexity of pose estimation systems can impose significant power and resource demands, can be a limiting factor in various applications, and can also limit the performance and scalability of tracking and localization applications that rely on pose information. For example, the computational complexity of pose estimation, visual and inertial tracking, and mapping algorithms can impose significant power and resource demands on devices in tracking and localization applications, particularly in large scale environments. Such power and resource demands are exacerbated by recent trends towards implementing such technologies in mobile and wearable devices, and making such devices smaller, lighter and more comfortable (e.g., by reducing the heat emitted by the device) to wear by the user for longer periods of time.

The approaches herein can greatly reduce the thermal, resource and power requirements of pose estimation, tracking, and localization applications, thus allowing such capabilities to be implemented in smaller, lighter, and more comfortable devices such as mobile and wearable devices. Thus, the approaches herein can enable smaller devices to implement tracking and mapping technologies while greatly reducing thermal and power requirements, despite the added computational complexity of such tracking and mapping technologies. Moreover, the approaches herein can increase the scalability and performance of pose estimation, tracking and mapping applications.

In some example implementations, pose estimation, tracking and mapping functions can be distributed across different devices to reduce the compute, power and thermal requirements imposed on such devices, and communication delays in such distributed implementations can be accounted for to prevent drift and tracking or mapping errors. To illustrate, in some cases, an example visual and inertial tracking and mapping system can include a tracking frontend, which can perform pose estimation and tracking functionalities; and a mapping backend, which can remotely perform mapping functionalities. The tracking frontend can be light and perform tracking and other localization functionalities in real time or near real time, and the mapping backend can perform compute intensive functionalities such as mapping functionalities.

In some examples, the mapping backend can be implemented on a server or network environment such as the cloud, the fog, a mobile edge, and the like. Moreover, the tracking frontend can be implemented at any computing device such as, for example and without limitation, a smartphone, a gaming console, a laptop computer, a tablet computer, a smart home assistant, a smart wearable device (e.g., a smart watch, an HMD, etc.), a robot or robotic device, a controller device (e.g., a game controller), an autonomous vehicle, a server system, etc. For example, the tracking frontend can be implemented at robot, a user's device, or any other computing device. The tracking frontend implementations can be modified for increased efficiency, accuracy and robustness, and to prevent or reduce errors or inaccuracies resulting from round-trip communication delays with the mapping backend. Various strategies can be implemented to further reduce the round-trip communication delays and the size or amount of data communicated between the tracking frontend and the mapping backend, thereby reducing errors, improving accuracy, and increasing efficiency of tracking and localization implementations.

According to at least one example, a method is provided for split tracking, mapping and pose prediction. The method can include computing, at a device, a predicted pose of the device at a future time, the future time being determined based on a communication latency between the device and a mapping backend system; sending, to the mapping backend system, the predicted pose of the device; receiving, from the mapping backend system, a map slice including a subset of map points corresponding to a scene associated with the device, the map slice being generated based on the predicted pose of the device, wherein the subset of map points corresponds to the predicted pose; and computing an updated pose of the device based at least partly on the map slice.

In another example, an apparatus is provided for split tracking, mapping and pose prediction. The apparatus can include a memory and a processor coupled to the memory, the processor configured to compute a predicted pose of the apparatus at a future time, the future time being determined based on a communication latency between the apparatus and a mapping backend system; send, to the mapping backend system, the predicted pose of the apparatus; receive, from the mapping backend system, a map slice including a subset of map points corresponding to a scene associated with the apparatus, the map slice being generated based on the predicted pose of the apparatus, wherein the subset of map points corresponds to the predicted pose; and compute an updated pose of the apparatus based at least partly on the map slice.

In another example, a non-transitory computer-readable medium is provided for split tracking, mapping and pose prediction. The non-transitory computer-readable medium can include instructions which, when executed by one or more processors, cause the one or more processors to compute a predicted pose of a device at a future time, the future time being determined based on a communication latency between the device and a mapping backend system; send, to the mapping backend system, the predicted pose of the device; receive, from the mapping backend system, a map slice including a subset of map points corresponding to a scene associated with the device, the map slice being generated based on the predicted pose of the device, wherein the subset of map points corresponds to the predicted pose; and compute an updated pose of the device based at least partly on the map slice.

In another example, an apparatus including means for split tracking, mapping and pose prediction is provided. The apparatus can include means for compute a predicted pose of the apparatus at a future time, the future time being determined based on a communication latency between the apparatus and a mapping backend system; send, to the mapping backend system, the predicted pose of the apparatus; receive, from the mapping backend system, a map slice including a subset of map points corresponding to a scene associated with the apparatus, the map slice being generated based on the predicted pose of the apparatus, wherein the subset of map points corresponds to the predicted pose; and compute an updated pose of the apparatus based at least partly on the map slice.

In some aspects, the method, non-transitory computer-readable medium, and apparatuses described above can include obtaining one or more sensor measurements from one or more sensors, the one or more sensor measurements including motion parameters associated with the device/apparatus; and computing the predicted pose based on the one or more sensor measurements and an amount of time corresponding to the communication latency between the device/apparatus and the mapping backend system.

In some aspects, the method, non-transitory computer-readable medium, and apparatuses described above can include calculating a motion of the device/apparatus, wherein computing the predicted pose is further based on the motion of the device/apparatus. Moreover, in some cases, the method, non-transitory computer-readable medium, and apparatuses described above can include tracking a set of features from a plurality of frames based on the one or more sensor measurements, wherein computing the updated pose of the device/apparatus is further based on the set of features from the plurality of frames.

In some aspects, the device in the method and non-transitory computer-readable medium described above can include a head-mounted display or a mobile phone, and the head-mounted display or the mobile phone can include the one or more sensors. In some aspects, the apparatuses described above can similarly include a head-mounted display or a mobile phone, and the head-mounted display or the mobile phone can include the one or more sensors. Moreover, in some cases, the one or more sensors can include an image sensor and/or an inertial measurement unit.

In some aspects, the map slice includes a portion of a map of the scene associated with the device/apparatus, and the subset of map points includes a subset of a plurality of map points in the map of the scene. Moreover, in some cases, each of the subset of map points represents a feature at a three-dimensional location within the scene, and the predicted pose is computed using a neural network.

In some cases, the map slice can include non-overlapping frames selected from a group of frames capturing at least a portion of the scene.

In some aspects, the method, non-transitory computer-readable medium, and apparatuses described above can include sending, to the mapping backend system, a set of frames and map points after every number of frames obtained; sending, to the mapping backend system, a set of tracked map points and pose information associated with the device/apparatus, the set of tracked map points and the pose information being sent after every frame from a plurality of frames obtained by the device/apparatus; and receiving, from the mapping backend system, a new map slice generated based on a map maintained by the mapping backend system, the set of frames, the map points, the set of tracked map points, and/or the pose information associated with the device/apparatus.

In some aspects, the method, non-transitory computer-readable medium, and apparatuses described above can include computing the updated pose of the device/apparatus based at least partly on a local map, the local map including a first feature stored by the device/apparatus and/or a second feature from one or more map slices generated by the mapping backend system. In some cases, the method, non-transitory computer-readable medium, and apparatuses described above can include supplementing the map slice with one or more features from the local map.

In some aspects, the method, non-transitory computer-readable medium, and apparatuses described above can include determining a length of a variable length sliding window of poses associated with the device/apparatus, wherein the length of the variable length sliding window of poses is based on a round-trip delay of map slice communications between the device/apparatus and the mapping backend system. Moreover, the method, non-transitory computer-readable medium, and apparatuses described above can include computing the updated pose of the device/apparatus based at least partly on the variable length sliding window of poses. In some cases, the updated pose of the device/apparatus is computed based at least partly on the variable length sliding window of poses when the round-trip delay exceeds a first threshold, a movement by the device/apparatus exceeds a second threshold, and/or a number of map slice features is below a third threshold.

In some aspects, the apparatuses described above can include the one or more sensors. In some examples, the apparatuses described above can include a mobile phone, a wearable device, a display device, a mobile computer, a head-mounted display, and/or a camera.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the above-recited and other advantages and features of the disclosure can be obtained, a more particular description of the principles described above will be rendered by reference to specific embodiments thereof which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1:
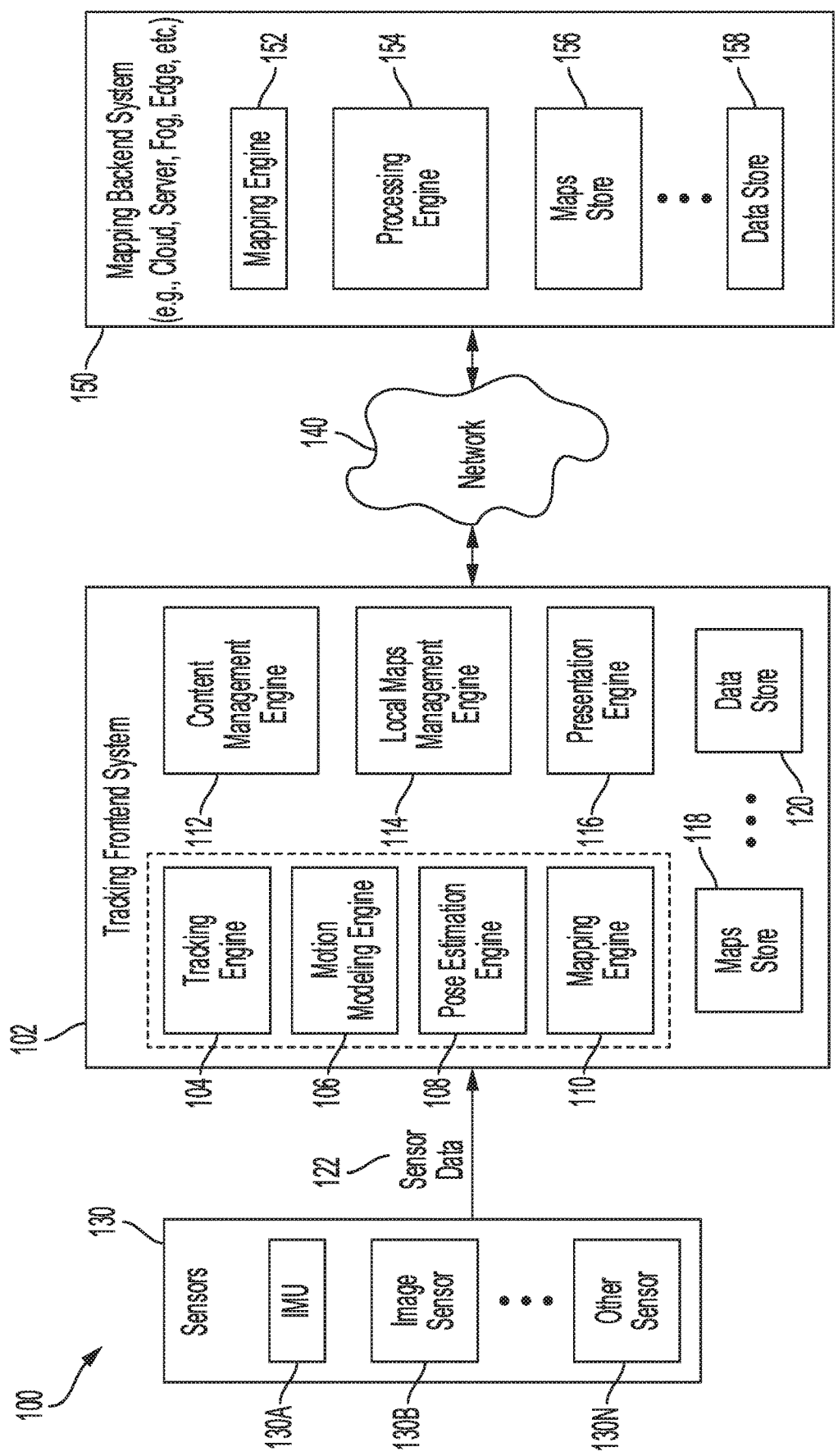
FIG. 1 illustrates an example distributed environment for tracking a device, mapping a scene, and computing a pose of the device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As previously mentioned, the computational complexity of pose estimation systems can impose significant power and resource demands, and can be a limiting factor in various applications. The computational complexity of pose estimation can also limit the performance and scalability of tracking and localization applications that rely on pose information. To illustrate, the computational complexity of pose estimation, visual and inertial tracking, and mapping algorithms can impose large power and resource demands on devices in tracking and localization applications, particularly in large scale environments. Such power and resource demands are exacerbated by recent trends towards implementing such technologies in mobile and wearable devices, and making such devices smaller, lighter and more comfortable (e.g., by reducing the heat emitted by the device) to wear by the user for longer periods of time.

The present disclosure describes systems, methods, and computer-readable media for providing split tracking and mapping. The split tracking and mapping technologies herein can be used to reduce thermal and power requirements in tracking and mapping applications, increase the scalability of tracking and mapping applications, and improve the efficiency and accuracy of tracking and mapping applications. Moreover, the split tracking and mapping technologies herein can be implemented in various use cases and applications. For example, the split tracking and mapping technologies herein can be implemented in robotic applications; autonomous driving; mobile imaging; extended reality, including 6 degrees of freedom (6DoF) or 3 degrees of freedom (3DOF) implementations; game controllers; etc. To illustrate, in some examples, the split tracking and mapping technologies herein can be implemented by autonomous robotic vacuum cleaners to perform path planning and localization based on pose; autonomous vehicles to achieve higher tracking, mapping and planning performance in real time (or near real time); game controllers connected to television-based consoles; etc.

In one non-limiting, illustrative example, the split tracking and mapping technologies herein can be implemented in extended reality applications, including 6DoF or 3DOF applications. The term extended reality (XR) can encompass augmented reality (AR), virtual reality (VR), mixed reality (MR), and the like. Each of these forms of XR allows users to experience or interact with immersive virtual environments or content. To provide realistic XR experiences, XR technologies generally aim to integrate virtual content with the physical world. This typically involves generating a map of the real-world environment and calculating a point of view or pose relative to the map of the real-world environment in order to anchor content to the real-world environment in a convincing manner. The point of view or pose information can be used to match virtual content with the user's perceived motion and the spatio-temporal state of the real-world environment. The XR systems can support various amounts of motion, such as 6 degrees of freedom (6DoF), which provides X, Y and Z (horizontal, vertical and depth) and pitch, yaw and roll; or 3 degrees of freedom (3DOF), which provides X, Y and Z only.

However, the computational complexity of the visual and inertial tracking and mapping algorithms can impose significant power and resource demands on XR systems. Such power and resource demands are exacerbated by recent trends towards implementing XR technologies in smaller and lighter devices, as well as devices that are designed to be more comfortable to wear on the user's head for longer periods of time (e.g., by reducing the heat emitted by the device). For example, wearable XR devices, such as head-mounted displays (HMDs), have a reduced amount of surface area available for dissipating heat. Since heat dissipation is limited by the laws of thermodynamics, the reduced amount of surface area at wearable XR devices limits their ability to dissipate heat, thereby increasing thermal conditions and making such devices less comfortable to wear. These and other factors, which are improved by the strategies herein, can create significant challenges in designing and implementing lightweight and comfortable XR devices.

As follows, the split tracking and mapping technologies herein will be described in the context of XR. However, it should be noted that, as previously explained, the split tracking and mapping technologies herein can be implemented in a wide variety of other applications such as, for example, robotic applications, autonomous driving, mobile imaging, gaming systems and controllers, and so forth. Accordingly, XR is provided throughout for explanation purposes as a non-limiting example application of the split tracking and mapping technologies herein.

Figure 8A:
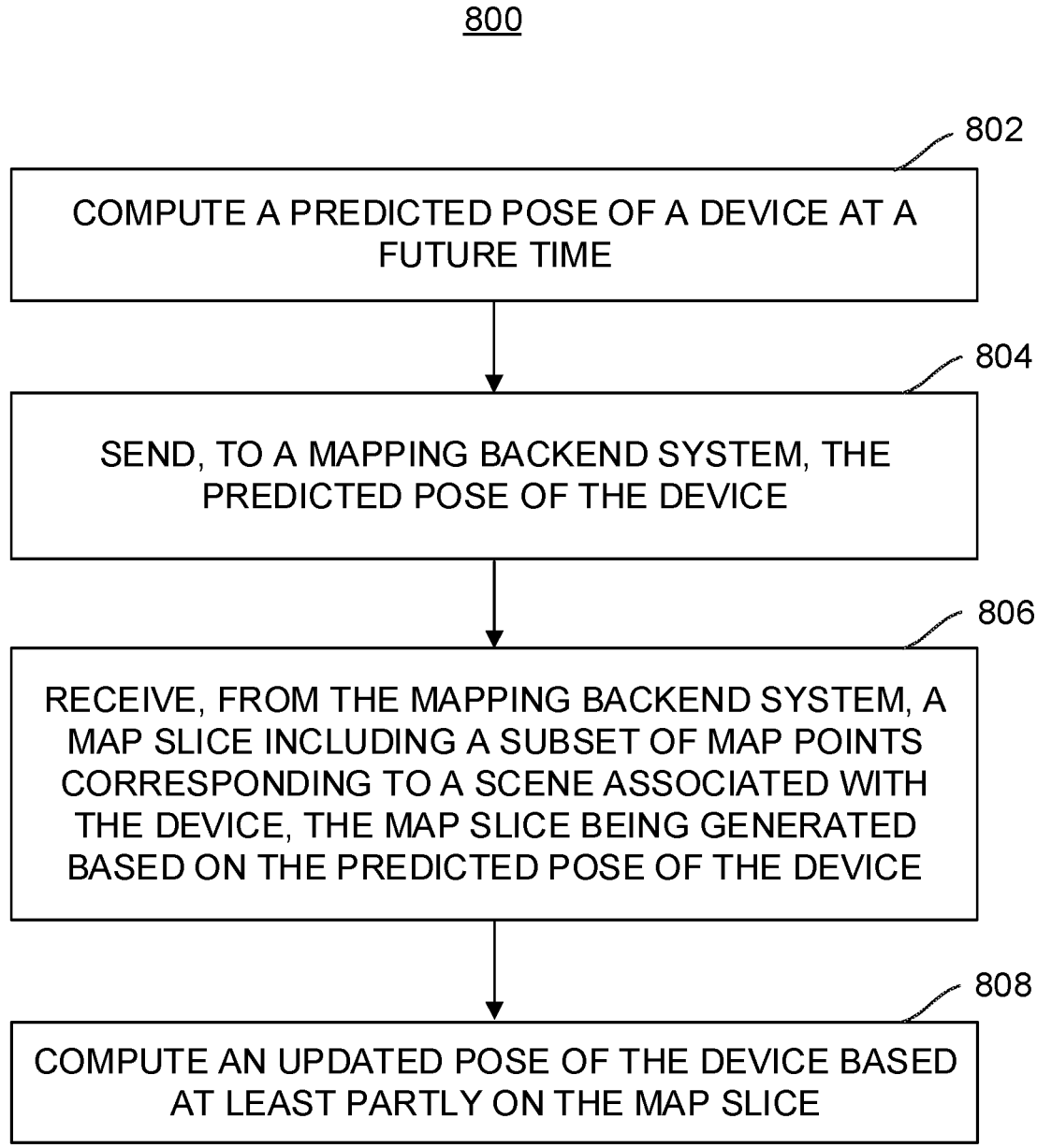
FIG. 8A and FIG. 8B illustrate example methods for split tracking, mapping, and pose prediction, in accordance with some examples.
Figure 8B:
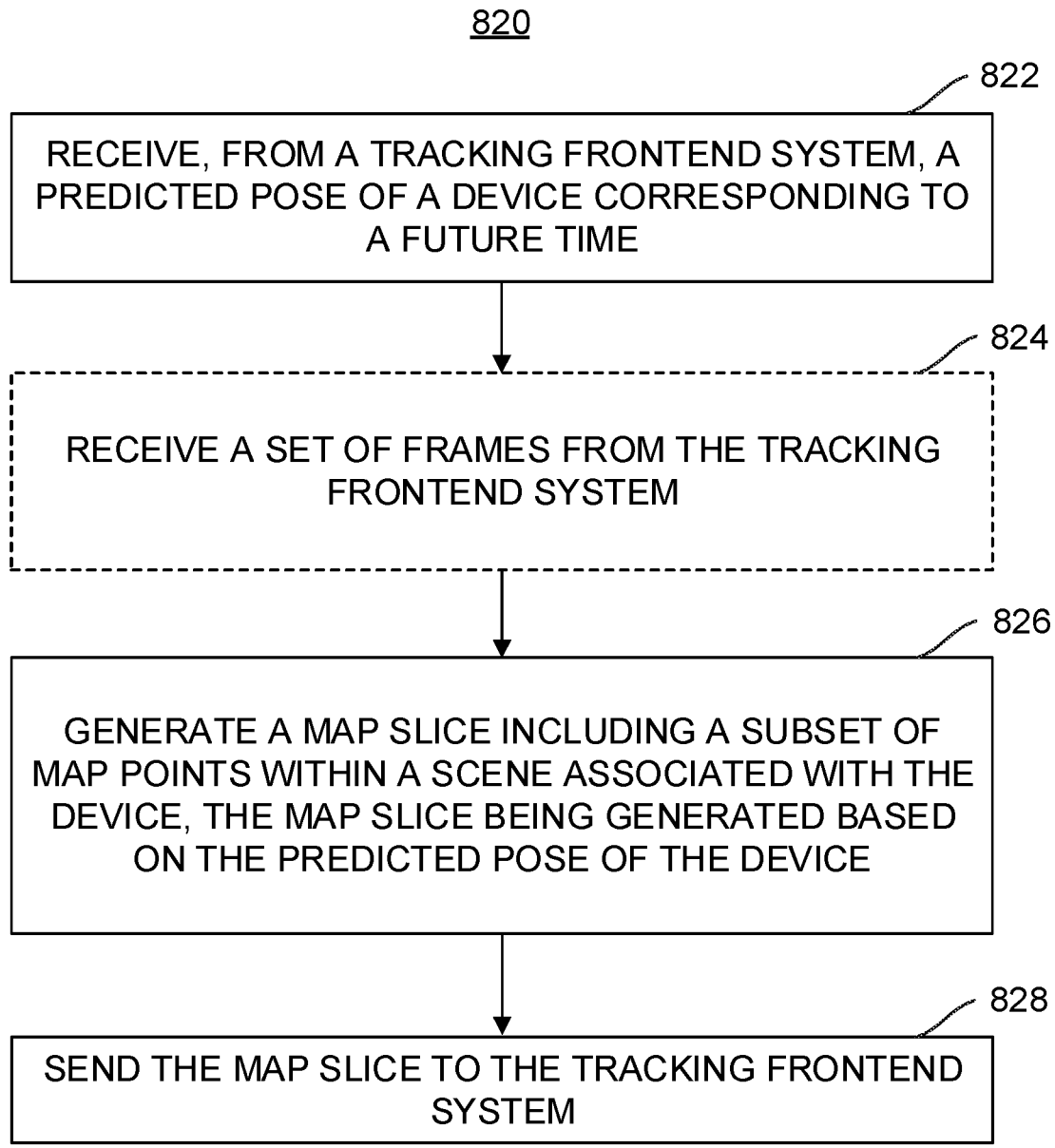
Figure 9:
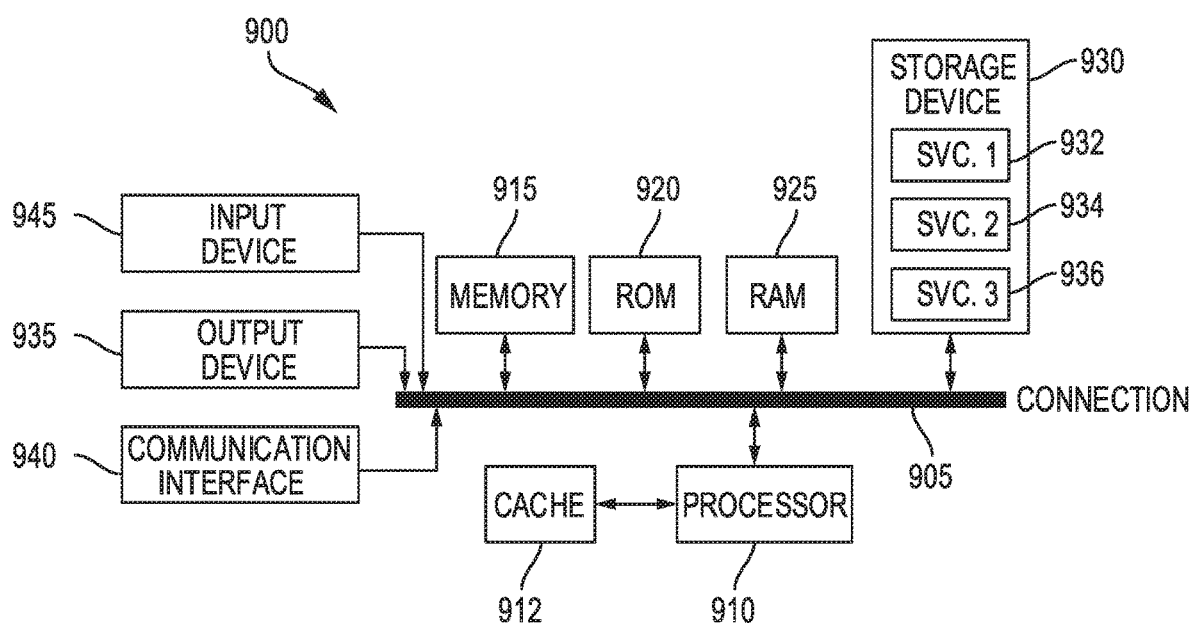
FIG. 9 illustrates an example computing device architecture, in accordance with some examples.

The present technology will be described in the following disclosure as follows. The discussion begins with a description of example systems and technologies for providing split tracking, mapping, and pose prediction, as illustrated in FIGS. 1 through 7. A description of example methods for providing split tracking, mapping, and pose prediction, as illustrated in FIGS. 8A and 8B, will then follow. The discussion concludes with a description of an example computing device architecture including example hardware components suitable for performing tracking, mapping, and associated operations, as illustrated in FIG. 9. The disclosure now turns to FIG. 1

FIG. 1 illustrates an example distributed environment 100 for tracking an object (e.g., a user, a device associated with a user, etc.), mapping a scene, and computing a 6DoF (or any other) pose(s). Split tracking and mapping can be implemented in the distributed environment 100 for a wide variety of applications such as robotic applications, gaming applications, XR applications, autonomous driving applications, etc. In one illustrative example, split tracking and mapping can be implemented in the distributed environment 100 to provide XR experiences such as 6DoF or 3DOF XR experiences.

The environment 100 can include a tracking frontend system 102, one or more sensors 130 for obtaining sensor measurements, a network 140, and a mapping backend system 150. The tracking frontend system 102, the one or more sensors 130, and/or the mapping backend system 150 can communicate over the network 140. The network 140 can include, for example, a private network (e.g., a local area network (LAN), a virtual private network (VPN), a virtual private cloud (VPC), an on-premises site or datacenter, etc.) and/or a public network (e.g., a core network, a service provider network, a public cloud, the Internet, a mobile communications network, etc.).

The tracking frontend system 102 can perform tracking, mapping, XR functionalities, etc., as further described herein. The tracking frontend system 102 can include a tracking engine 104, a motion modeling engine 106, a pose estimation engine 108, a mapping engine 110, a content management engine 112, a local maps management engine 114, a presentation engine 116, a maps store 118, and a data store 120. In some cases, the tracking frontend system 102 can also include other components, such as, for example and without limitation, a display, a projector, an image processing engine, a filtering engine, a sensor fusion engine, a denoising engine, a rules engine, etc.

The components of the tracking frontend system 102 can include and/or can be implemented using electronic circuits or other electronic hardware, which can include, for example, one or more programmable electronic circuits (e.g., microprocessors, graphics processing units (GPUs), digital signal processors (DSPs), central processing units (CPUs), image signal processors (ISPs), and/or any other suitable electronic circuits), and/or can include and/or can be implemented using computer software, firmware, or any combination thereof, to perform the various operations described herein. While the tracking frontend system 102 is shown to include certain components, one of ordinary skill will appreciate that the tracking frontend system 102 can include more or fewer components than those shown in FIG. 1. For example, in some instances, the tracking frontend system 102 can also include one or more memory components (e.g., one or more RAMs, ROMs, caches, buffers, and/or the like) and/or processing devices that are not shown in FIG. 1.

The tracking frontend system 102 can be part of, or implemented by, one or more computing devices, such as one or more user devices (e.g., a smart television, a gaming system, a etc.), one or more personal computers, one or more processors, one or more mobile devices (e.g., a smartphone, a camera, a tablet computer, an internet-of-things device, etc.), one or more smart wearable devices (e.g., a head-mounted display (HMD), smart glasses or goggles, a smart watch, etc.), one or more display devices (e.g., a heads-up display, a digital display, etc.), one or more Internet-of-Things (IoT) devices, etc. In some cases, the one or more computing devices that include the tracking frontend system 102 can include one or more hardware components such as, for example, one or more wireless transceivers, one or more input devices (e.g., a touch screen, a keyboard, a mouse, an input sensor, etc.), one or more output devices (e.g., a display, a speaker, a projector, etc.), one or more sensors (e.g., an image sensor, an inertial measurement unit, an accelerometer, a gyroscope, a positioning sensor, a tilt sensor, a light-emitting sensor, an audio sensor, etc.), one or more storage devices, one or more processing devices, etc. In some examples, a computing device that includes the tracking frontend system 102 can be an electronic device, such as a phone (e.g., a smartphone, a video conferencing system, or the like), a camera (e.g., a digital camera, an IP camera, a video camera, a camera phone, a video phone, or any suitable capture device), a desktop computer, a laptop or notebook computer, a tablet computer, a set-top box, a television, a display device, a video gaming console, a media streaming device, or any other suitable electronic device.

In some cases, the tracking frontend system 102 can be part of, or implemented by, one or more devices or combination of devices, such as a head-mounted display (HMD) device, a laptop computer, a tablet computer, a television, a smart wearable device, a smart vehicle, a mobile phone, smart goggles or glasses, a camera system, a display system, a projector, a heads-up display (HUD), or any other suitable electronic device. For example, the tracking frontend system 102 can be part of an HMD device, a HUD device including a display (e.g., a transparent display) for presenting data, or a client computer. In another example, the tracking frontend system 102 can be implemented by a combination of an HMD device, a display or HUD, and/or a mobile computing device.

The tracking frontend system 102 can receive input data from one or more of the sensors 130, and use the input data to perform various tasks for providing an XR experience, including, for example, mapping operations, tracking or localization operations, virtual content anchoring operations, virtual content generation operations, etc. The sensors 130 can include, for example, one or more inertial measuring units (IMUs) 130A, one or more image sensors 130B (e.g., camera sensors, video sensors, etc.), and/or one or more other sensors 130N such as, for example, one or more light emitters (e.g., one or more lasers), one or more global positioning system (GPS) devices, one or more radars, one or more accelerometers, one or more gyroscopes, one or more magnetometers, one or more altimeters, one or more tilt sensors, one or more motion detection sensors, one or more light sensors, one or more audio sensors, one or more lidars, etc. In some cases, one or more of the sensors 130 can be part of, or implemented by, the tracking frontend system 102. For example, in some cases, the tracking frontend system 102 can implement an IMU (130A), an image sensor (130B), and/or any other sensor (130N).

The one or more IMUs 130A can be used to measure motion dynamics (e.g., speed, direction, acceleration, position, etc.) of a device (e.g., the tracking frontend system 102). In some cases, the one or more IMUs 130A can also be used to measure the magnetic field surrounding the device. The one or more image sensors 130B can capture image and/or video data. The one or more image sensors 130B can include, for example, one or more image and/or video capturing devices, such as a digital camera, a video camera, a phone with a camera, a tablet with a camera, an image sensor, or any other suitable image data capturing device. The one or more other sensors 130N can include, for example, one or more light-emitting devices such as an infrared (IR) laser or a lidar, one or more audio sensors, one or more tilt sensors, one or more gyroscopes, one or more accelerometers, one or more GPS devices, one or more radars, one or more positioning sensors, one or more motion detection sensors, etc. In some cases, the one or more other sensors 130N can include a structured light sensor or device for scanning and/or determining the dimensions and/or movement of an object (e.g., a person, a device, an animal, a vehicle, etc.) or scene. The structured light sensor or device can project a known shape or pattern onto an object or scene, and determine the dimensions and movement of the object or scene based on measured or detected deformations of the shape or pattern.

The tracking engine 104, the motion modeling engine 106, the pose estimation engine 108, and the mapping engine 110 can receive sensor data 122 from one or more sensors 130, and use the sensor data 122 to track the device, model the motion of the device, estimate a pose (e.g., a 6DoF pose, a 3DoF pose, etc.) of the device, and/or generate one or more maps of one or more real-world scenes such as a room, a building, a stadium, a vehicle, an outdoor area, a store, a house, an office, a parking lot, a garage, etc. The sensor data 122 can include, for example, one or more images, one or more videos, audio or sound data, location information, radar returns, object and/or scene measurements (e.g., an object's and/or scene's shape or dimensions, motion or movement, trajectory or direction, characteristics, speed or velocity, elevation, position, force, angular rate, pattern(s), motion dynamics, etc.), GPS information, etc.

In some examples, the tracking engine 104 can estimate and track the pose of a device. In some cases, the tracking engine 104 can also track other features. For example, the tracking engine 104 can detect and/or track features (e.g., objects, characteristics, etc.) in a scene. The estimated pose information and/or tracked features can be used by the tracking frontend system 102 or any other device to provide an XR experience to a user. The tracking engine 104 can detect and/or track features based on sensor data 122 from one or more sensors 130. For example, the tracking engine 104 can detect and/or track features based on IMU measurements (e.g., force measurements, angular rate measurements, position measurements, velocity measurements, altitude measurements, motion measurements, acceleration measurements, location measurements, motion dynamics measurements, trajectory measurements, etc.), image data, video data, audio data, radar returns, proximity measurements, etc. In some cases, the tracking engine 104 can track a pose of a device and/or detect or track features based on map data, as further described herein.

Since sensors can contain errors (which can be random in nature), the observations or measurements from sensors (130) can be processed through one or more filters that estimate a target's states (e.g., pose, velocity, trajectory, acceleration, position, altitude, etc.) and error covariance. Accordingly, in some examples, the tracking engine 104 can implement one or more filters (e.g., one or more Kalman filters, one or more extended Kalman filters, etc.), one or more motion models (e.g., one or more acceleration models, one or more angular rate models, one or more velocity models, etc.), and/or any other tracking algorithms or models to estimate a target's (e.g., a user, a device associated with a user, etc.) state (e.g., pose, velocity, trajectory, position, acceleration, altitude, etc.). In some example, the tracking engine 104 can process sensor data 122 using a Kalman filter or an extended Kalman filter (EKF) to estimate the states and error covariances of a device.

The Kalman filtering process, also known as linear quadratic estimation (LQE), uses an algorithm that can apply a series of measurements observed over time, which can contain statistical noise and other inaccuracies, and produce estimates of unknown variables by estimating a joint probability distribution over the variables for each timeframe. The EKF filtering process implements an EKF algorithm, which is the nonlinear version of the Kalman filter, that linearizes about an estimate of the current mean and covariance. The Kalman or EKF filter can include a prediction step and a measurement update step. The prediction step relies on one or more models (e.g., an acceleration model, an angular rate model, a velocity model, etc.) for the target dynamics to propagate or predict the target's states at some point in the future. Once the target's states have been propagated, a measurement can be applied to further increase the accuracy of the estimation.

The motion modeling engine 106 can estimate or model movement of a device. The motion modeling engine 106 can estimate or model the movement of a device based on sensor data 122 from one or more sensors 130. For example, the motion modeling engine 106 can estimate or model the movement of a device based on IMU measurements, image data, video data, audio data, radar returns, proximity measurements, etc. In some examples, the motion modeling engine 106 can estimate or model the movement of a device using machine or deep learning techniques. For example, the motion modeling engine 106 can estimate or model the movement of a device using one or more neural networks, one or more machine learning (ML) algorithms, etc.

The pose estimation engine 108 can estimate, track, and/or predict a pose of a device. In some implementations, the pose of the device can be correlated or associated with the pose of a user. For example, in some cases, the pose of an HMD device can move in synchrony with a user's pose, and thus can be correlated or associated with the user's pose. However, in other implementations, a user may have a different or separate pose relative to the device. For example, a head-up display (HUD) in a vehicle can have a different or separate pose relative to a user in the vehicle. As another example, in an HMD device application, a user's head pose can, in some cases, be different than the user's eye pose as the user's eyes can move relative to the HMD device without head movement by the user, thus resulting in relative differences between the HMD device's pose and the pose of the user's head and/or eyes.

The pose estimation engine 108 can use sensor data 122 from one or more sensors 130 to estimate or predict a pose of a device. In some cases, the pose estimation engine 108 can also use an estimate or model of the movement of a device to estimate or predict a pose of the device. The pose estimation engine 108 can obtain the estimate or model of the movement of the device from the motion modeling engine 106, for example. Moreover, in some examples, to estimate the pose of a device, the pose estimation engine 108 can also use tracking data from the tracking engine 104. In some cases, the pose of a device can be determined or inferred by calculating the pose of a user associated with the device. For example, a pose of a user can be used to infer or determine a pose of a device worn by or mounted on the user (e.g., an HMD, a smart wearable device, etc.), a device held by or in close proximity to the user (e.g., a laptop computer, a smartphone, a tablet computer, etc.), or any other device associated with the user.

The mapping engine 110 can perform mapping operations. The mapping engine 110 can use data from one or more sensors 130 to generate one or more maps or representations of one or more scenes, such as a room, a building, an outside environment, etc. The one or more maps or representations can chart, plot, model, or identify objects, space, features, and/or characteristics of the mapped scene. For example, the mapping engine 110 can generate a local map that charts, plots, models, or identifies objects, space, features, and/or characteristics (e.g., shape, volume, size, position, etc.) of the mapped scene. In some implementations, the local map can be a two-dimensional (2D) or three-dimensional (3D) grid or model of the scene and can include multiple map or feature points.

In some cases, the local map can include one or more frames from a sequence of frames captured by the image sensor 130B and/or any other image capturing device such as an image and/or video camera. A frame can include a video frame of a video sequence or a still image. A frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture. Moreover, the frames included in the local map can provide a snapshot of the scene associated with the local map. Such frames can be used to generate or update the local map and/or mapping data by the tracking frontend system 102 and/or the mapping backend system 150, as further described herein.

In some implementations, the mapping engine 110 can generate and/or obtain a sparse map of a scene. The sparse map can include a subset of map or feature points associated with the scene. In some examples, the sparse map can include only a portion of a map of a scene and/or only a portion of features existing or detected in a scene. For example, a sparse map may include a subset of features or map points that would otherwise be included in a full or dense map of a scene, and/or may contain only a slice or portion of a full or dense map of the scene. To illustrate, in some cases, a sparse map may only map a section in a room (as opposed to mapping the entire room) or a subset of features in the room.

In some cases, the mapping engine 110 can also use data from the tracking engine 104, the motion modeling engine 106, and/or the pose estimation engine 108, such as tracking, pose or location information, to generate one or more maps. Moreover, in some implementations, in addition to, or in lieu of, generating the one or more maps, the mapping engine 110 can perform operations to map virtual objects or content to features in a map of a scene. In such implementations, the mapping engine 110 can also use information from the tracking engine 104, the motion modeling engine 106, and/or the pose estimation engine 108 when determining where or how to map virtual objects or content to features in a map.

In some cases, the mapping engine 110 can receive maps and/or mapping data from a remote device or source, such as the mapping backend system 150 as further explained herein. For example, the mapping engine 110 can receive maps and/or mapping data from the mapping backend system 150 and store the maps and/or mapping data on the tracking frontend system 102 (e.g., on the maps store 118) and/or supplement the maps and/or mapping data with mapping data obtained or generated by the mapping engine 110.

In some examples, the mapping engine 110 can store any maps and/or mapping data generated or obtained in a maps store 118 for use in tracking an object (e.g., a user or device), mapping a scene, providing an XR experience to a user, etc. The maps store 118 can be a storage or repository of maps or mapping data available for one or more scenes, such as a room, a building, a vehicle, an outside area or environment, etc. The maps store 118 can include one or more storage devices for storing maps and any other data. In some cases, the maps store 118 can also store sparse maps maintained by the tracking frontend system 102.

The tracking frontend system 102 can also include a content management engine 112. The content management engine 112 can manage, generate, synthesize, modify, and/or process content used to provide XR experiences to the user. In some cases, the content management engine 112 can also process media content, such as image data, video data, audio data, etc. For example, the content management engine 112 can perform image processing operations, formatting operations, compression operations, decompression operations, edit operations, etc.

In some cases, the content management engine 112 can store content, such as digital content, metadata, media content, and/or any other type of data on the data store 120 and/or retrieve such data or content from the data store 120. The data store 120 can store various content items generated, stored, received, managed, and/or used by the content management engine 112 and/or the tracking frontend system 102. Moreover, the data store 120 can include one or more storage devices for storing data.

In some cases, the content management engine 112 can synthesize content for presentation and/or inclusion in an XR presentation or experience. For example, the content management engine 112 can perform various computer vision and/or graphics techniques (e.g., feature extraction, feature matching or synchronization, feature classification, image processing, filtering, blending, depth estimation, 3D modeling, pose recognition, image stitching, object recognition, denoising, animation, rendering, etc.) to generate realistic virtual content and/or simulate environments and experiences that are virtual.

The synthesized content generated by the content management engine 112 can include, for example, 2D or 3D digital content and/or multimedia content, such as virtual scenes, virtual objects, virtual views, virtual overlays, interactive virtual content, audio, graphical models, computer-generated imagery, virtual simulations, etc. In some cases, the synthesized content can also include one or more visual or special effects, such as animations, simulations, optical effects, mechanical effects, etc.

The content management engine 112 can take content (e.g., audio, image content, video content, data, digital content, multimedia content, etc.) and synthesize the content to generate the virtual content or view for presentation to a user. The content management engine 112 can also use information about one or more frames of reference (e.g., view point data, pose data, positioning data, etc.) to generate realistic and/or immersive content for XR experiences. In some illustrative examples, the content management engine 112 can use the information about the one or more frames of reference to match, map, or synchronize features in content, objects and/or real-world scenes (or maps of real-world scenes), model objects and/or scenes with merged perspectives, produce realistic spatio-temporal content, incorporate motion dynamics of a scene, etc.

The tracking frontend system 102 can also include a local maps management engine 114. The local maps management engine 114 can manage and/or implement rules or policies for managing, obtaining, generating, configuring, and/or storing maps at the tracking frontend system 102. For example, the local maps management engine 114 can maintain rules specifying requirements or restrictions on the number of maps that can be stored or maintained at the tracking frontend system 102 (e.g., at the maps store 118); the size of maps stored or maintained at the tracking frontend system 102; which (or how many) map points or features can or should be cached at the tracking frontend system 102; which (or how many) map points or features should be added or removed from a map, such as a sparse map; which maps should be removed, updated, or maintained; which (or how many) frames can or should be selected for generating a map or requesting a map from another source (e.g., the mapping backend system 150); how (e.g., which strategies should be used) maps should be populated (e.g., how a sparse map should be populated); etc.

To illustrate, in some cases, the local maps management engine 114 can implement rules for adding features to a sparse map when such features are removed from the tracking engine 104, adding a subset (or full set) of features detected to a map such as a sparse map, locally caching features or maps received from the mapping backend system 150, restricting the size of locally-stored maps, aging maps, removing or updating maps when they are obsolete or no longer relevant to the device (e.g., no longer applicable to the device because the device is no longer located at the scene associated with a particular map), etc. In another example, the local maps management engine 114 can implement rules specifying which or how many (if any) image frames can or should be maintained in a specific map, which or how many (if any) image frames should be retained or stored locally, which or how many (if any) image frames should be sent to the mapping backend system 150 when requesting maps or mapping data from the mapping backend system 150, etc.

In some cases, the data stored on the data store 120 can include, for example and without limitation, frames captured by the image sensor 130B, sensor data 122 from one or more sensors 130, digital or virtual content, games, advertisements, tagged geolocations, Internet content, audio content, videos, images, documents, interactive content, content overlays, web pages, files, data (e.g., statistics, historical data, etc.), electronic or digital maps, tracking rules, map rules, track data, pose estimates, and/or any other type of media, digital or virtual content or data. In some examples, the data store 120 can store or cache poses obtained or generated by the tracking frontend system 102. In some implementations, the number of poses stored or cached can be fixed or predetermined. In other implementation, the number of poses stored or cached can be dynamic. For example, the number of poses stored or cached can be based on a sliding window of poses. The sliding window of poses can include a number of poses corresponding to a number of past frames captured by the image sensor 130B. The number of poses can vary based on one or more factors such as, for example, a round-trip delay of communications between the tracking frontend system 102 and the mapping backend system 150.

In some cases, the round-trip delay can correspond to the amount of latency or delay experienced or estimated for the tracking frontend system 102 to receive a map or mapping data from the mapping backend system 150 after requesting such data from the mapping backend system 150. Such delays can depend on one or more factors, such as network bandwidth, network congestion (e.g., congestion of network 140), network connectivity conditions, processing and/or network capabilities of the tracking frontend system 102 and/or the mapping backend system 150, input/output operations per second (IOPS) metrics for accessing or retrieving data from the mapping backend system 150, etc. Moreover, by storing or caching a sliding window of poses that is a function of the round-trip delay of communications between the tracking frontend system 102 and the mapping backend system 150, the tracking frontend system 102 can ensure that in the case of a delay in receiving a new or updated map or mapping data from the mapping backend system 150, the tracking frontend system 102 has enough pose information that it can use to continue accurately tracking device state and motion dynamics and using available mapping data until the new or updated map or mapping data is received from the mapping backend system 150. For example, during a delay in receiving a new or updated map or mapping data, the tracking frontend system 102 can use a sparse map and the cached pose information to continue tracking and/or mapping operations until the new or updated map or mapping data is received from the mapping backend system 150.

In some implementations involving tracking of a user's pose, the tracking frontend system 102 can limit motion to photon latency, which describes the amount of time between the user performing a motion and a display rendering content for that particular motion, and improve the user experience. For example, the tracking frontend system 102 can support pose updates at a frequency that will not make the user of the device (e.g., the tracking frontend system 102) sick. In fast link systems, this can be accomplished using the distributed tracking and mapping approaches herein and/or a stored or cached sliding window of user poses as described above. In other contexts or when features are sparse, this can be accomplished using a more localized approach, such as by using a stored or cached sliding window of user poses as described above.

In some cases, the maps store 118 and/or the data store 120 can store or maintain frames captured by the image sensor 130B and/or used to generate one or more maps. For example, the maps store 118 can store maps as well as frames used to generate such maps. The frames (or frame information such as tags or reference points) can be included in the maps and/or stored separately. As another example, the data store 120 can store frames captured by the image sensor 130B, including frames used to generate maps and/or any other frames.

The tracking frontend system 102 can also implement a presentation engine 116 to project, present, and/or render the content for the user, such as virtual content or views. In some cases, the presentation engine 116 can project a virtual content or view on an object or display, such as a window or a screen, for the user. In other examples, the presentation engine 116 can render and/or display a virtual content or view for presentation on a display device. In some implementations, such display device can be part of, or implemented by, the tracking frontend system 102. For example, such display device can be a display or screen on the tracking frontend system 102 or connected to the tracking frontend system 102. In other implementations, such display device can be a device separate from the tracking frontend system 102. For example, such display device can be a remote or external screen or display, a separate window with an embedded transparent display, a separate television screen, etc.

As previously explained, the tracking frontend system 102 can communicate with the mapping backend system 150 over the network 140. The tracking frontend system 102 can communicate with the mapping backend system 150 to request maps or mapping data generated by the mapping backend system 150 based on frames and/or pose information generated and/or provided by the tracking frontend system 102. For example, the tracking frontend system 102 can send one or more frames providing a snapshot of a scene or environment to the mapping backend system 150 as well as pose information, which the mapping engine 152 on the mapping backend system 150 can use to generate a map or map slice for the tracking frontend system 102. The mapping backend system 150 can then communicate the generated map or map slice to the tracking frontend system 102 over the network 140.

The mapping backend system 150 can include a datacenter, a public or private cloud, a mobile edge network, a fog computing network, a distributed compute environment, a private or public network, a server(s), a virtual machine(s), a software container(s), and/or any other remote or external network, infrastructure, or device(s). In some examples, the mapping backend system 150 can be a system(s), application(s), and/or service(s) provided by a private, public, or hybrid cloud. In other examples, the mapping backend system 150 can be a system(s), application(s), and/or service (s) provided by a mobile edge or fog computing network.

The mapping backend system 150 can include a mapping engine 152 for generating maps and/or map slices for the tracking frontend system 102. The mapping backend system 150 can generate such maps and/or map slices based on requests and data provided by the tracking frontend system 102, such as frames (e.g., image or video snapshots of a scene, a subsample of frames captured by the image sensor 130B, etc.) and/or pose information, as previously explained. The mapping backend system 150 can identify features in a scene to generate a map or map slice of the scene containing such features and/or map points representing the scene and/or the features in the scene. The mapping backend system 150 can update existing maps or maps slices for the tracking frontend system 102 and/or generate new maps or map slices as needed or requested by the tracking frontend system 102.

In some cases, the mapping backend system 150 (e.g., via the mapping engine 152) can identify non-overlapping frames from a group of frames received from the tracking frontend system 102 and use the non-overlapping frames to generate a non-overlapping frame-based map or map slice for the tracking frontend system 102. Using non-overlapping frames to generate a map or map slice can reduce the size of the map or map slice generated and transmitted to the tracking frontend system 102 while ensuring that the map or map slice covers a large area of the scene so the tracking frontend system 102 has a map that will likely remain relevant or applicable to the device for a longer period of time to account for longer, potential delays in communications of new or updated map data between the mapping backend system 150 and the tracking frontend system 102. Since using non-overlapping frames to generate the map or maps slice can reduce the size of the map or map slice, it can also reduce the latency in communications of such map or map slice back to the tracking frontend system 102, thereby reducing the risk that map data at the tracking frontend system 102 will become irrelevant or inaccurate before the tracking frontend system 102 can receive new or updated mapping data from the mapping backend system 150.

In some cases, the mapping backend system 150 (e.g., via the mapping engine 152) can also perform other operations such as, for example and without limitation, processing frames obtained from the tracking frontend system 102, pose information obtained from the tracking frontend system 102, tracking data or state (e.g., state estimates and covariances) obtained from the tracking frontend system 102, requests from the tracking frontend system 102, bundle adjustment operations as further described herein, map densification operations as further described herein, frame addition and/or deletion operations or instructions (e.g., adding or removing frames from a generated map, adding or removing frames from storage, etc.), etc.

The mapping backend system 150 can also limit the amount of data transmitted to the tracking frontend system 102 in order to reduce latency, increase efficiency, and/or save resources. For example, in some cases, rather than sending to the tracking frontend system 102 a full or dense map of a scene, the mapping backend system 150 can send a slice, segment, subset, or portion (e.g., a map slice) of a full or dense map of the scene. To illustrate, the mapping backend system 150 may only send to the tracking frontend system 102 a map slice of a scene determined or estimated to be relevant or applicable to a device (e.g., the tracking frontend system 102) associated with a user when the tracking frontend system 102 receives the map slice (e.g., at a future time). A scene can be associated with, relevant to, or applicable to, a device and/or user when the device is disposed within the scene, when the scene is visible to the device and/or user (e.g., from a location of the device and/or user), when the device and/or user is/are interacting with or observing the scene, etc. In some cases, the map slice that is sent to the tracking frontend system 102 can be selected a communication delay between the mapping backend system 150 and the tracking frontend system 102 and/or a predicted location of the device at a future time corresponding to a time when the tracking frontend system 102 is expected to receive the map slice after being transmitted by the mapping backend system 150 (e.g., based on a communication latency).

In some examples, the mapping backend system 150 further reduce the map data sent to the tracking frontend system 102 in various ways. For example, in some cases, the mapping backend system 150 can limit what it sends to the tracking frontend system 102 to map point identifiers (IDs) associated with a map slice, updated 3D locations, modified poses, and/or other map update information such as an indication of dropped frames, map or map point observations, map points, features, an extracted image patch at multiple pyramid levels, etc. In some cases, this can reduce the data traffic from the mapping backend system 150 to the tracking frontend system 102, reduce the power footprint associated with such data transfer, reduce the power demands and computations performed at the tracking frontend system 102 (e.g., by shifting them to the mapping backend system 102 which typically will have significantly more resources), etc.

The mapping backend system 150 can also include a processing engine 154 for performing various processing tasks or operations. In some examples, the processing engine 154 can process frames obtained from the tracking frontend system 102, pose information obtained from the tracking frontend system 102, tracking data or state (e.g., state estimates and covariances) obtained from the tracking frontend system 102, requests from the tracking frontend system 102, frame addition and/or deletion operations or instructions (e.g., adding or removing frames from a generated map, adding or removing frames from storage, etc.), etc.

In some cases, the processing engine 154 can perform management operations (e.g., managing instructions, managing jobs or services, coordinating operations or tasks by different components, manage load balancing operations, etc.), orchestration operations, machine or deep learning operations, image and/or video processing operations (e.g., feature extraction, feature matching or synchronization, feature classification, filtering, blending, depth estimation, 3D modeling, pose recognition, image stitching, object recognition, denoising, animation, rendering, segmentation, frame rate conversion, detail enhancement, edge enhancement, motion compensation, color calibration, noise reduction, color space or point conversion, brightness adjustment, aspect ratio control, deinterlacing, etc.), and so forth.

The mapping backend system 150 can also include a maps store 156 and a data store 158. The maps store 156 can store maps, map slices, map information (e.g., map slice identifiers, 3D locations, map or map point observations, map points, features, extracted image patches, indications of added and/or dropped frames, map updates, pose information, tracking state, etc.), frames associated with maps or map slices, map metadata or tags, etc. The data store 158 can store any data such as, for example and without limitation, statistics, calculations, files, frames, location information, virtual content, logs, tags, identifiers, media content, job queues, and/or any other type of data.

While FIG. 1 illustrates the maps store 118 and the data store 120 as separate or individual stores, and the maps store 156 and the data store 158 as separate or individual stores, one of ordinary skill in the art will recognize that the maps store 118 and the data store 120 can be implemented as a single combined store, and the maps store 156 and the data store 158 can similarly be implemented as a single combined store. Moreover, one of ordinary skill in the art will recognize that the maps store 118 and the data store 120 can be implemented by a same storage device(s), separate storage devices, or any other storage configuration or distribution, and the maps store 156 and the data store 158 can also be implemented by a same storage device(s), separate storage devices, or any other storage configuration or distribution.

Figure 2:
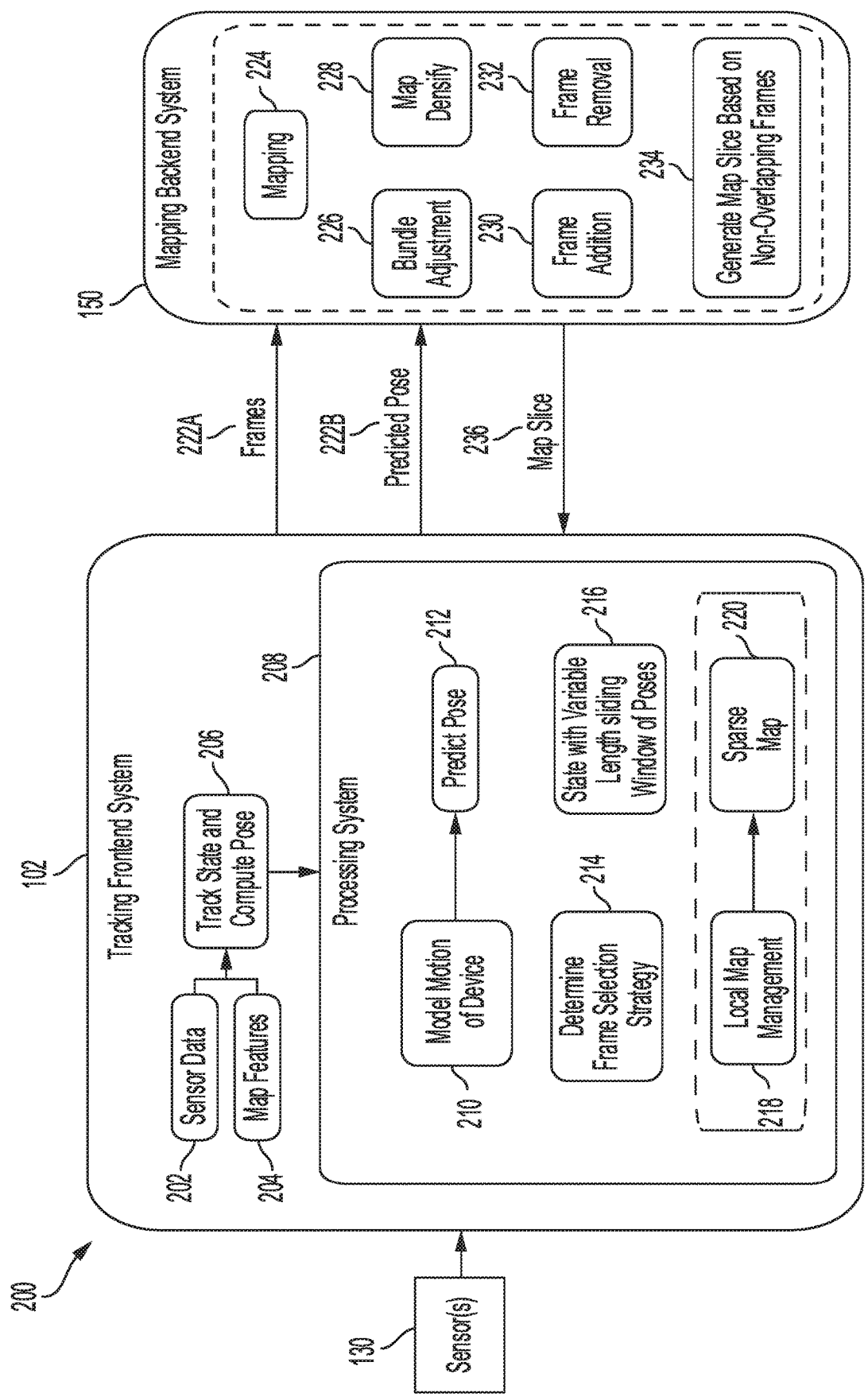
FIG. 2 is a block diagram of an example system implementation for split tracking, mapping, and pose prediction associated with a device, in accordance with some examples.

FIG. 2 is a block diagram of an example system implementation 200 for split tracking, mapping, and computing a 6DoF pose associated with a device. In this example, at block 206, the tracking frontend system 102 tracks a state of a device (and/or a user associated with the device) and computes a pose of the device (and/or a user associated with the device). The tracking frontend system 102 can track the state and pose using sensor data 202 obtained from one or more sensors 130 (e.g., IMU 130A, image sensor 130B, etc.)

and map features 204. In some examples, the sensor data 202 can include IMU measurements, such as angular and/or linear velocity, acceleration, motion, positioning, location, etc. The map features 204 can include tracked features or visual data such as feature points in a map of a scene. In some cases, the map features 204 can include feature points from a local slice or segment of an entire map of the scene.

The tracking frontend system 102 can provide the tracked state and calculated pose to a processing system or algorithm at block 208. At block 210, the tracking frontend system 102 can model a motion of the device. In some cases, the motion of the device can be indicative of the user's head motion. In other cases, the motion of the device can be used to model the user's head motion relative to the device, track the user's eye pose relative to the device, and/or calculate user pose variations. In some examples, the tracking frontend system 102 can model the motion of the device using machine or deep learning techniques. For example, the tracking frontend system 102 can implement a neural network to model the motion of the device. In some cases, the tracking frontend system 102 can model the motion of the device using the tracked state and/or computed pose from block 206, the sensor data 202, and/or previous data capturing or representing previous motions of the device.

At block 212, the tracking frontend system 102 can use the model of the motion of the device to predict a pose of the device. In some examples, the tracking frontend system 102 can also use sensor data 202 and/or the tracked state and/or computed pose from block 206 to predict the pose of the device. In some examples, the tracking frontend system 102 can use a neural network to predict the pose of the device, as further described below with respect to FIGS. 5 and 6.

When the tracking frontend system 102 needs map data, it can send a request for the map data to the mapping backend system 150. In the request, the tracking frontend system 102 can send one or more frames 222A and a predicted pose 222B calculated at block 212. The mapping backend system 150 can use the one or more frames 222A and the predicted pose 222B to generate a map of the device's scene and return a map slice or segment of the map to the tracking frontend system 102. The one or more frames 222A can include a subsample of frames captured by the sensors 130 (e.g., via the image sensor 130B). Moreover, the one or more frames 222A can provide a visual snapshot of the device's scene, which the mapping backend system 150 can use to detect features in the device's scene and generate the map of the device's scene.

In some cases, the tracking frontend system 102 can also send map points to the mapping backend system 150. The mapping backend system 150 can also use the map points from the tracking frontend system 102 to generate the map of the device's scene and return the map slice or segment of the map to the tracking frontend system 102. In some cases, the tracking frontend system 102 can send the map points to the mapping backend system 150 at specific intervals. For example, the tracking frontend system 102 can send the map points at every few frames (e.g., a certain number of frames).

The predicted pose 222B can be a pose (e.g., 6DoF pose, 3DoF pose, etc.) of the device predicted for a future time where the device is expected to be within the scene (e.g., an area in a room or building where the device is predicted to be at the future time, a different room or building where the device is predicted to be at the future time, or any other location, site, or area where the device is expected to be at the future time) or within a different scene (e.g., a different building, a different room, a different scene, etc.). For example, the predicted pose 222B can be a 6DoF pose of the device predicted for a future time. In some cases, the future time associated with the predicted pose can be a period into the future calculated based on a round-trip delay (e.g., predicted or actual/historical) of communications between the tracking frontend system 102 and the mapping backend system 150.

For example, the tracking frontend system 102 can determine that the round-trip time (RTT) of communications (e.g., map data requests and results) between the tracking frontend system 102 and the mapping backend system 150 is (historically, actual, or predicted) 250 ms. In this example, the tracking frontend system 102 can then compute the predicted pose 222B 250 ms into the future based on the 250 ms RTT so the map data received from the mapping backend system 150 corresponds to the current pose of the device at the time the map data is received by the tracking frontend system 102.

In some cases, the tracking frontend system 102 can add buffer time to the RTT used to calculate the predicted pose to account for certain factors, such as jitter, unforeseen delays, processing overhead, etc. Such buffer time can be calibrated so that even if it exceeds the RTT actually experienced during the transmission of the map data request and result, the map data calculated based on the RTT and added buffer time is still visible or within the field of view of the device at the time of receipt (e.g., despite the device not yet having reached the location predicted based on the RTT and the added buffer time). The RTT or round-trip delay can account for the latency or delay of round-trip communications between the tracking frontend system 102 and the mapping backend system 150, as previously noted. In some cases, the RTT or round-trip delay can also account for processing overhead at the tracking frontend system 102 and/or the mapping backend system 150, jitter, latency or congestion patterns, IOPS at the tracking frontend system 102 and/or the mapping backend system 150, and/or any other factor that could affect the amount of time it takes for round-trip communications, such as a map data request and response, between the tracking frontend system 102 and the mapping backend system 150. In some cases, the tracking frontend system 102 and/or the mapping backend system 150 can implement a jitter buffer to address potential jitter or inconsistencies in network communications.

In some implementations, when sending a request to the mapping backend system 150 for map data, the tracking frontend system 102 at block 214 can determine a frame selection strategy. The frame selection strategy can define how to select the frames 222A (e.g., what frames to select, how many frames to select, etc.) sent to the mapping backend system 150 when requesting map data and/or how the mapping backend system 150 should select which frames to use when generating a map or map slice (e.g., what frames to select, how many frames to select, etc.). For example, the frame selection strategy can specify that the mapping backend system 150 should only select and use non-overlapping frames for creating a map or map slice for the tracking frontend system 102 and/or that the tracking frontend system 102 should only send non-overlapping frames to the mapping backend system 150 when requesting map data. The non-overlapping frames can include a set of frames (e.g., from a sequence of frames) having a minimum overlap with each other, having a common point of reference (e.g., a current or reference frame), and/or having a common observation (e.g., visibility, perspective, relevance, etc.) with a specific frame (e.g., a current or reference frame). The non-overlapping frame selection strategy can ensure that the map data (e.g., map slice or segment) received from the mapping backend system 150 covers a larger area or scene without increasing the size of the map data (e.g., the map slice or segment).

When the tracking frontend system 102 sends to the mapping backend system 150 a map data request, which can include the one or more frames 222A and the predicted pose 222B, the mapping backend system 150 can use the one or more frames 222A and the predicted pose 222B to generate a map of the scene and send to the tracking frontend system 102 a map slice 236 of the map of the scene. The map slice can be a segment or portion of the map and can include a subset of map points and/or features associated with the map and/or scene. Moreover, the map slice 236 can cover a location where the device is predicted to be when the tracking frontend system 102 receives the map slice 236 and/or a location that is estimated to be visible to the device (e.g., within the device's field of view) from the location of the device at the time the tracking frontend system 102 receives the map slice 236. For example, the mapping backend system 150 can provide a map slice that captures an area corresponding to, or based on, the predicted pose 222B of the device and/or the RTT or round-trip delay used to predict the pose and/or request the map slice.

The tracking frontend system 102 can use the map slice 236 to track the device and/or any objects in the scene (e.g., within the area corresponding to the map slice 236). For example, the tracking frontend system 102 can track from the map slice 236 received from the mapping backend system 150. In some examples, the tracking frontend system 102 can use the map slice 236 to generate a local map, such as a sparse map 220 or a full map. For example, the tracking frontend system 102 can use the map slice 236 to generate a sparse map 220 of the scene for storing or caching at the tracking frontend system 102 for potential future use (e.g., in the absence of a current, accurate, useful or relevant map or map slice from the mapping backend system 150) in tracking state and/or updating pose information (e.g., based on map points in the sparse map 220). As another example, the tracking frontend system 102 can supplement the map slice 236 with additional map points or features tracked or determined by the tracking frontend system 102 using sensor data (e.g., 202), previous map data, etc., to generate a full map of the scene.

In some implementations, the tracking frontend system 102 can determine which map points from the map slice 236 to add to, or keep in, the sparse map 220 based on confidence or trackability scores associated with the map points from the map slice 236. For example, the tracking frontend system 102 can compute a confidence or trackability score for each map point in the map slice 236, and determine which map points from the map slice 236 to use for the sparse map 220. If a map point has a high or threshold confidence or trackability score, the tracking frontend system 102 can decide to use that map point in the spare map 220. Alternatively, if the map point does not have a high or threshold confidence or trackability score, the tracking frontend system 102 can decide not to use the map point in the spare map 220 (e.g., the tracking frontend system 102 can exclude or remove the map point from the sparse map 220). The tracking frontend system 102 can calculate the confidence or trackability score for a map point based on, for example, a number of frames that include the map point or that can be used to track the map point (e.g., a map point that can only be tracked in one frame may receive a lower score than a map point that can be tracked in multiple frames), a probability of accuracy or relevance associated with that map point, a statistical relevance or accuracy associated with that map point, etc.

In some cases, if the delay in receiving a map slice (e.g., 236) from the mapping backend system 150 is so great that the received map slice is no longer relevant or useful (e.g., because the device has moved beyond the area, or out of visible range from the area, covered by the received map slice) or if the device has moved beyond what previously expected (e.g., if the device is exploring an area or moving at a higher rate or a longer distance than expected) such that the received map slice is no longer relevant or useful, the tracking frontend system 102 at block 216 can use stored or cached state with a variable length sliding window of poses to perform tracking and/or updates of pose information until a relevant or accurate map slice is received from the mapping backend system 150. The state with the variable length sliding window of poses can include a number of previously-cached poses. The number of previous poses cached or stored can vary and may depend on the RTT or round-trip delay of communications between the tracking frontend system 102 and the mapping backend system 150. For example, the size of the sliding window of poses maintained by the tracking frontend system 102 can be calculated to include enough poses to account for the time (e.g., RTT or round-trip delay) it will take for the tracking frontend system 102 to receive from the mapping backend system 150 an updated map slice it can use for tracking and pose estimation.

In some examples, when storing or caching the state with the sliding window of poses, the tracking frontend system 102 can add frames to the state as the tracking frontend system 102 sends such frames to the mapping backend system 150. In some cases, the tracking frontend system 102 can also remove a frame from the stored state with the sliding window of poses when an associated map point in the map slice (236) from the mapping backend system 150 is added while inserting the frame to the mapping backing system 150. For low network latency, map points added in a frame will be quickly returned to the tracking frontend system 102 and, therefore, the corresponding frame can be deleted quickly. In another example, the tracking frontend system 102 can remove a frame from the stored state with the sliding window of poses if the map points added in the frame are no longer visible from the current pose.

By maintaining a variable length sliding window of poses, the tracking frontend system 102 can reduce the memory and computation on the tracking frontend system 102 when the network latency is low. This approach can help increase efficiency and/or accuracy when the device is exploring (e.g., moving about, within, around, etc.) an area or scene (e.g., moving about, within, around, etc.), as an updated map slice to account for the device's movement will take some time to arrive. This approach can also be useful when the tracking frontend system 102 has or receives an incorrect or inaccurate map slice due to, for example, a pose prediction error, as the map points in such map slice may still be visible in some frames in the sliding window of poses. The tracking frontend system 102 can use observations in the sliding window of poses to compute the pose of a current frame.

In some cases, at block 218, the tracking frontend system 102 can perform local map management to manage the size and/or number of maps maintained at the tracking frontend system 102. For example, the tracking frontend system 102 can implement a map management policy to control the size of the sparse map 220. The map management policy can define a maximum and/or minimum size for the sparse map 220, a maximum and/or minimum number of map points or features in the sparse map 220, a policy for aging the sparse map 220 or portions of the sparse map 220 (e.g., map points, features, etc.), a frequency for updating the sparse map 220, etc. In some examples, the map management policy can define how or when to add or remove frames to the sparse map, as previously described.

In some cases, the tracking frontend system 102 can send frames with new map points and observations of existing map points to the mapping backend system 150. In some cases, the tracking frontend system 102 can send such frames at a predefined frequency or a variable frequency. For example, in some cases, the tracking frontend system 102 can send such frames at a higher frequency when the device is exploring (e.g., moving about, around, within, etc.) the scene, and a lower frequency when the device is more static or once the scene has been mapped.

Moreover, the tracking frontend system 102 can poll the mapping backend system 150 for a local map slice as needed or desired to compute a pose, such as a 6DoF pose. The local map slice can be updated if the device (e.g., the tracking frontend system 102) has moved significantly or the map has changed. In some cases, the frequency of the local map slice update may be higher than the frame insertion frequency. Further, as previously explained, the tracking frontend system 102 can track the map points in the local map slice and use the tracked map points to compute a pose in conjunction with the sensor data (e.g., 202) from the sensors 130.

In some implementations, the tracking frontend system 102 can maintain a full simultaneous localization and mapping (SLAM) map. In some examples, to reduce the data traffic from the mapping backend system 150 to the tracking frontend system 102, the mapping backend system 150 can send to the tracking frontend system 102 a set of features (e.g., sliced features), where each slice feature has observations of a map point, an extracted image patch at multiple pyramid levels, a map point ID, and/or a 3D location. In some cases, the tracking frontend system 102 can also maintain the frames in the map or map slice. For example, the tracking frontend system 102 can retain frames when it sends them to the mapping backend system 150.

These approaches can drastically reduce the data traffic from the mapping backend system 150 to the tracking frontend system 102, as the tracking frontend system 102 can locally do patch extraction. These approaches can also reduce power requirements due to data transfer, and limit the amount of computations for map management tasks such as bundle adjustment and densification, which can be performed by the mapping backend system 150 as further explained herein.

In some cases, the tracking frontend system 102 can update a local map based on the information received from the mapping backend system 150 or drop those frames from the local map that have already been removed by the mapping backend system 150. In some implementations, the tracking frontend system 102 can maintain a full SLAM map and also perform some of the map management tasks, such as some of the low intensity map management tasks (e.g., densification, observation finder, etc.). This can further reduce the data shared between the mapping backend system 150 and the tracking frontend system 102. This can also eliminate the need to share frames or images, thereby reducing data traffic and addressing privacy concerns. The mapping backend system 150 can instead perform some of the more resource intensive map management tasks such as loop closer, bundle adjustment, etc.

In some cases, the mapping backend system 150 may only work with descriptors of features, which are sent by the tracking frontend system 102 to the mapping backend system 150 for every frame. For example, the information sent by the tracking frontend system 102 to the mapping backend system 150 can include feature descriptors, feature IDs, frame poses estimated by the tracking frontend system 102, initial estimates of 3D positions of newly added features, etc.

When receiving a request for map data including frames 222A and predicted pose 222B, the mapping backend system 150 can perform mapping operations at block 224 to generate a map of the scene, which it can use to send the map slice 236 to the tracking frontend system 102. In some examples, the mapping backend system 150 can also perform other operations such as bundle adjustment 226 (e.g., simultaneously refining the 3D coordinates describing the scene geometry, the parameters of the relative motion, and the optical characteristics of the image sensor used to generate the frames, according to an optimality criterion involving the corresponding image projections of all points), map densification 228, frame addition 230, and frame removal 232.

In some implementations, the mapping backend system 150 at block 234 can generate a map slice based on non-overlapping frames as previously explained. For example, the mapping backend system 150 can analyze the frames 222A and determine which of the frames 222A do not overlap or have a minimum overlap with each other and have a common observation or view with a current frame.

Figure 3:
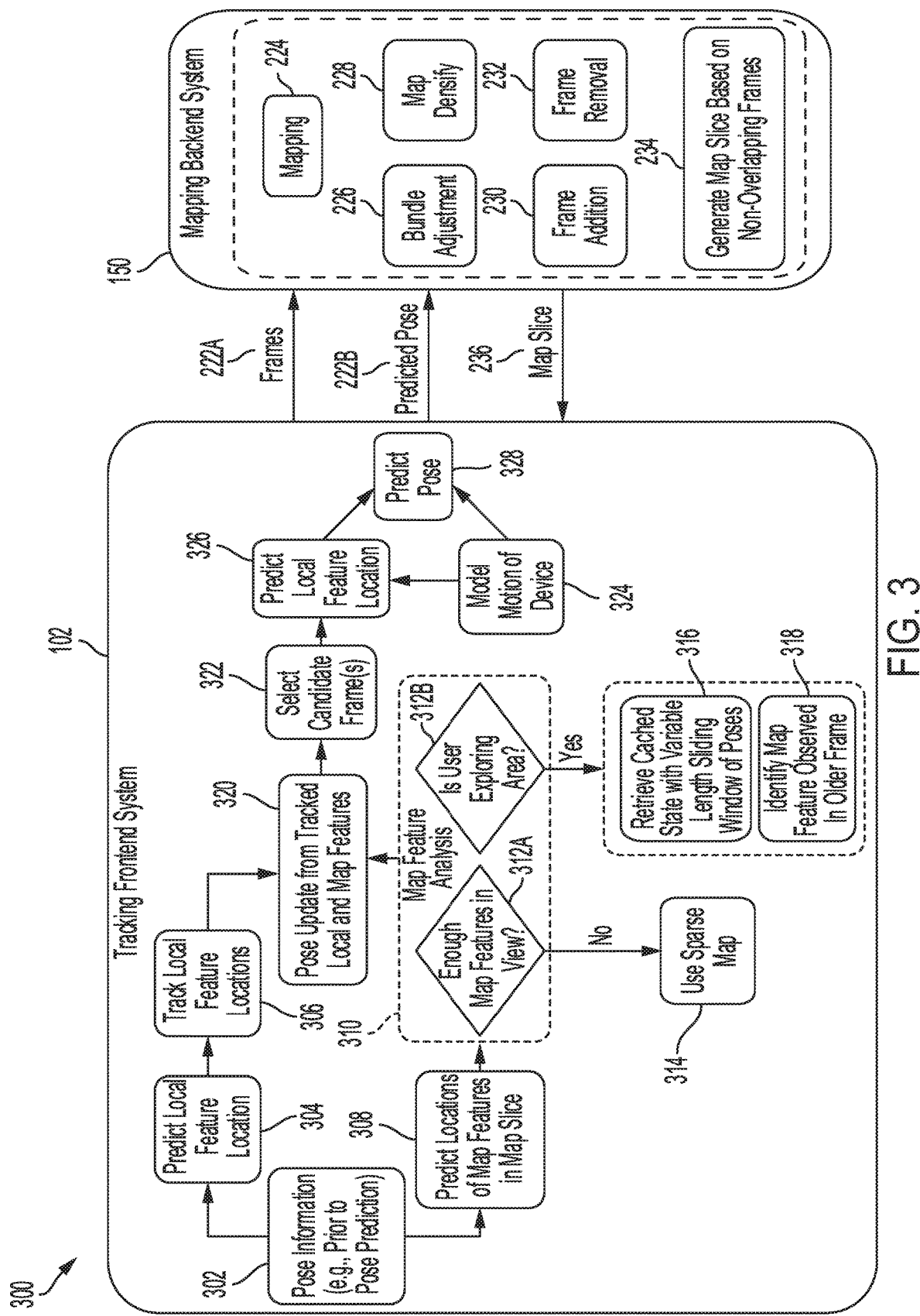
FIG. 3 illustrates an example flow for split tracking, mapping, and pose estimation, in accordance with some examples.

FIG. 3 illustrates an example flow 300 for split tracking, mapping, and 6DoF pose estimation. At block 302, the tracking frontend system 102 obtains pose information prior to performing pose prediction. At block 304, the tracking frontend system 102 uses the pose information to predict local feature locations in frames. At block 306, the tracking frontend system 102 tracks the local feature locations and provides the tracked local feature locations to block 320 for updating pose information, as further described below.

At block 308, the tracking frontend system 102 predicts the locations of map features in a map slice (e.g., map slice 236) at the tracking frontend system 102.

At block 310, the tracking frontend system 102 performs a map feature analysis. In the map feature analysis, at block 312A, the tracking frontend system 102 determines if the map slice contains enough map features that are visible (e.g., visible to a user/device and/or from one or more current frames). The tracking frontend system 102 can determine that enough map features are in view if a number of map points in view is sufficient to enable robust or accurate tracking (e.g., within a threshold accuracy) using such map points.

If at block 312A the tracking frontend system 102 determines that there are not enough map features in view, at block 314 the tracking frontend system 102 can use a local sparse map (e.g., sparse map 220) to track one or more features. Accordingly, the tracking frontend system 102 can proceed to block 320 to update pose information using the local sparse map. Alternatively, if at block 312A the tracking frontend system 102 determines that there are enough map features in view, at block 312B the tracking frontend system 102 can check if the device (e.g., the tracking frontend system 102) is currently exploring an area (e.g., moving about, around, within, etc.). If the device is not currently exploring an area, the tracking frontend system 102 can proceed to block 320.

If the device is exploring an area, the amount of movement by the device can cause a map slice to quickly become inaccurate or obsolete. Accordingly, if the device is exploring an area, at block 316 the tracking frontend system 102 can retrieve cached state with a variable length sliding window of poses (e.g., state 216) and, at block 318, use the cached state to identify one or more map features observed in an older (e.g., previous) frame(s). The tracking frontend system 102 can then proceed to block 320, where it can use the one or more map features observed in the older frame(s) to update pose information.

At block 320, the tracking frontend system 102 can update pose information based on tracked local features (e.g., features calculated from sensor data such as IMU measurements and image data or frames) and map features. The tracked local and map features can include the tracked local features from block 306 and the predicted map features from block 308. In some cases, if at block 312A the tracking frontend system 102 determined that the map slice did not contain enough map features in view, the tracked local and map features at block 320 can include map features tracked from the local sparse map. Similarly, if at block 312B the tracking frontend system 102 determines that the device is exploring an area, then the tracked local and map features at block 320 can include the map features observed in older frame(s) from block 318.

At block 322, the tracking frontend system 102 can select a candidate frame(s) to send to the mapping backend system 150, which the mapping backend system 150 can use to generate a map and/or map slice, and/or to use at block 324 to predict a location of one or more features. In some examples, the tracking frontend system 102 can select one or more candidate frames based on the updated pose calculated at block 320, a frame selection strategy (e.g., a non-overlapping frame selection strategy as previously described), a relevance of one or more frames, etc. For example, the tracking frontend system 102 can select one or more of the most relevant frames, which can be, for example, one or more frames determined to provide a best (e.g., most complete, most accurate, etc.) snapshot of the device's scene and/or an area within the device's scene where the device is currently located or is predicted to be located at a future time (e.g., a future time determined based on the updated pose, the RTT or round-trip delay of communications between the tracking frontend system 102 and the mapping backend system 150, etc.). As another example, the tracking frontend system 102 can select a number of frames that provide a snapshot of the device's scene or an area in the device's scene and have minimal (or no) overlap with each other and/or other frames.

In some cases, selecting the one or more candidate frames can include (or can depend on) determining a frequency and/or number of frames to select for a particular situation. For example, if the tracking frontend system 102 determines that the device is exploring a scene (e.g., moving about, around, or within the scene), the tracking frontend system 102 can select a higher number of frames, or use/provide frames with a higher frequency, than if the device is determined to be static. As another example, if the tracking frontend system 102 determines that due to higher tracking performance requirements and/or higher network latency conditions it needs to reduce the amount of data processed and/or sent to the mapping backend system 150, it can select a subset of candidate frames determined to provide the most accurate representation or depiction of the scene with minimal burden on the network and compute resources.

At block 324, the tracking frontend system 102 can model a motion of the device. Here, the tracking frontend system 102 can predict a motion of the device at a future time. The future time can be, for example, a future time calculated based on a RTT or round-trip delay of communications between the tracking frontend system 102 and the mapping backend system 150. For example, the tracking frontend system 102 can use the RTT to predict the motion of the device at a time when a map slice requested from the mapping backend system 150 would be returned or received by the tracking frontend system 102. In some examples, the tracking frontend system 102 can implement a neural network and/or deep learning techniques to predict the motion of the device. As previously noted, the motion of the device can be, in some cases, indicative of a head motion of the user. Thus, in such examples, the motion of the device may be used to model or infer a head motion of the user. In some implementations, the head motion of the user can be used at blocks 326 and/or 328, described below, to predict a location of one or more features in the scene and/or predict a pose of the device and/or the user.

At block 326, the tracking frontend system 102 can use the one or more candidate frames selected at block 322 and the motion of the device modeled at block 324 to predict a location of one or more features in the scene. The tracking frontend system 102 can predict the location of the one or more features at a future time, which can be based on, for example, when the tracking frontend system 102 expects to receive a map slice or map slice update from the mapping backend system 150 (e.g., based on the RTT of communications).

At block 328, the tracking frontend system 102 can use the motion of the device modeled at block 324 to predict a pose of the device at a future time. In some examples, the tracking frontend system 102 can also use other information to predict the pose of the device, such as, for example, sensor data (e.g., IMU measurements, image data, etc.), the one or more candidate frames selected at block 322, previous pose information, etc. Moreover, the future time used to predict the pose of the device can be based on, for example, when the tracking frontend system 102 expects to receive a map slice or map slice update from the mapping backend system 150 (e.g., based on the RTT of communications). For example, the tracking frontend system 102 can use network latency information to predict the pose of where the device is expected to be when the tracking frontend system 102 receives a requested map slice from the mapping backend system 150.

The tracking frontend system 102 can then use the one or more candidate frames (e.g., frames 222A) and the predicted pose (e.g., predicted pose 222B) to request a new or updated map slice from the mapping backend system 150. For example, the tracking frontend system 102 can send a request to the mapping backend system 150 for a new or updated map slice, and provide the one or more candidate frames and the predicted pose with the request for use by the mapping backend system 150 to generate the new or updated map slice.

The mapping backend system 150 can receive the one or more candidate frames (e.g., frames 222A) and the predicted pose (e.g., 222B) and perform a mapping operation 224 to generate a map slice (236) based on the one or more candidate frames and the predicted pose. The map slice can provide a snapshot of an area or region in a scene where the device is predicted to be (e.g., based on the predicted pose and/or the network latency or RTT) when the tracking frontend system 102 receives the map slice from the mapping backend system 150. In some cases, the mapping backend system 150 can generate and send to the tracking frontend system 102 a full map of the scene associated with the device.

However, in other cases, the mapping backend system 150 may only provide a map slice (e.g., a segment or portion of the entire map of the scene) to the frontend tracking system 150. For example, the mapping backend system 150 may only provide a map slice in order to limit the size of the mapping data sent to the tracking frontend system 102 and the amount of network and/or processing delay when providing such mapping data to the tracking frontend system 102, thereby avoiding or limiting potential tracking drift or errors and mapping inaccuracies resulting from any movement by the device between the time the mapping data is requested by the tracking frontend system 102 and the time the mapping data is received from the mapping backend system 150.

In some cases, the mapping backend system 150 can perform bundle adjustment 226 on map points and the frames (e.g., 222A) received from the tracking frontend system 102 in order to create a more accurate map. In some implementations, the mapping backend system 150 can perform bundle adjustment as an optimization strategy to calculate the exact (or more accurate) location of map points on the frames (e.g., 222A) from the tracking frontend system 102. For example, the mapping backend system 150 can use observations of map points visible in multiple frames to determine exact or corrected locations of one or more map points using, for example, triangulation of map points, views, frames, coordinates, etc.

In some cases, the mapping backend system 150 can perform other mapping computations, such as map densification (228), loop closure (e.g., recognizing when the device has returned to a previously mapped region and using such information to reduce the uncertainty in the map estimate), frame addition 230, frame removal 232, etc.

Moreover, in some cases, the mapping backend system 150 can generate a map slice (e.g., 236) using non-overlapping frames. For example, the mapping backend system 150 can analyze the frames (e.g., 222A) from the tracking frontend system 102 and determine which of the frames do not overlap or have a minimum overlap with each other and have a common observation or view with a current frame. The mapping backend system 150 can then use those frames that do not overlap or have a minimum overlap and have a common observation or view with a current frame to generate the map slice for the tracking frontend system 102. This way, the mapping backend system 150 can generate a map slice that covers a large area while limiting or reducing the number of frames included or implemented in the map slice and the size of the map slice. In other words, using non-overlapping frames to generate the map slice, the mapping backend system 150 can maximize the field of view covered by the map slice without increasing the size of the map slice.

Once the mapping backend system 150 has generated the map slice, it can send the map slice to the tracking frontend system 102, which can use the map slice (and map points) for tracking. For example, upon receiving the map slice, the tracking frontend system 102 can determine which map points in the map slice are visible from the device's location, and use such map points to track the position of the device. Alternatively, if the tracking frontend system 102 determines that the map slice does not contain enough (or any) map points that are visible from the device's location, the tracking frontend system 102 can use a local sparse map to track the position of the device, use the map points from the sparse map and/or the map slice to generate a more complete or accurate map, and/or use the map points from the map slice to add map points to a local sparse map.

Figure 4:
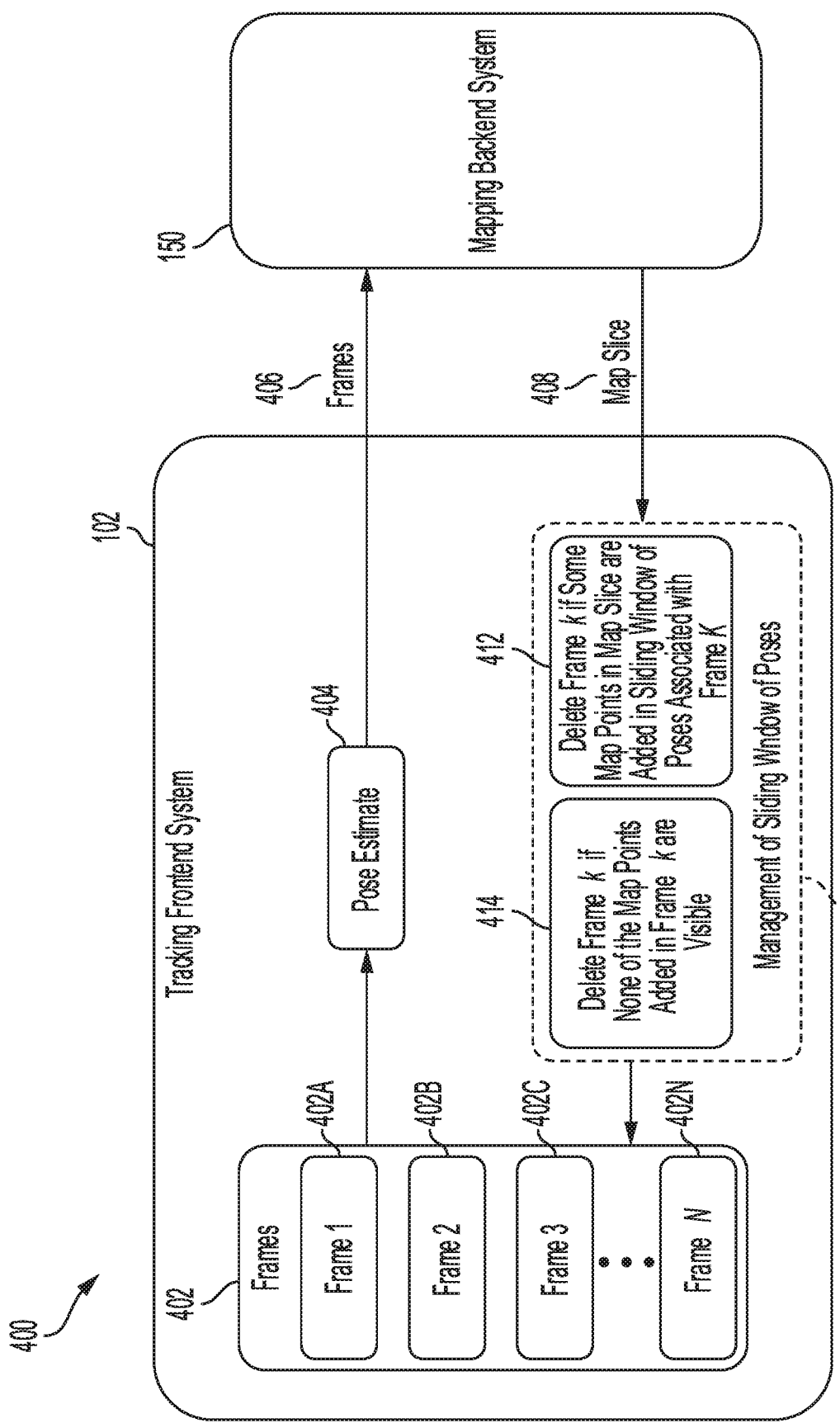
FIG. 4 illustrates an example flow for managing a sliding window of poses in a mapping space, in accordance with some examples.

FIG. 4 illustrates an example flow 400 for managing a sliding window of poses in a mapping space. In this example, the tracking frontend system 102 can maintain stored frames 402, including for example frames 402-N, which can be used by the tracking frontend system 102 for tracking and/or mapping tasks. The tracking frontend system 102 can estimate a pose 404 of the device based on one or more of the stored frames 402, as previously explained, and send the estimated pose 404 and one or more frames 406 to the mapping backend system 150. The mapping backend system 150 can use the estimated pose 404 and one or more frames 406 from the tracking frontend system 102 to generate a map slice 408 for the tracking frontend system 102.

The mapping backend system 150 can then send the map slice 408 to the tracking frontend system 102, which the tracking frontend system 102 can use to track the position of the device. The tracking frontend system 102 can maintain a memory of poses in the form of a sliding window of poses 410 for use in tracking the location of the device in a current frame in the absence of map points from the mapping backend system 150. For example, if the tracking frontend system 102 experiences a delay in receiving the map slice 408 from the mapping backend system 150, it can use pose information from the sliding window of poses 410 to track the location of the device as the tracking frontend system 102 waits to receive the map slice 408 and associated map points from the mapping backend system 150. The tracking frontend system 102 can rely on the sliding window of poses 410 to track the position of the device until new or updated mapping data (e.g., map slice 408) is received from the mapping backend system 150. Once the tracking frontend system 102 receives the map slice 408 from the mapping backend system 150, it can use the map points in the map slice 408 to track the position of the device.

To manage the memory of poses (e.g., the sliding window of poses 410), when the tracking frontend system 102 receives the map slice 408 from the mapping backend system 150, it can delete any of the stored frames 402 that are deemed unnecessary or redundant because the map slice 408 from the mapping backend system 150 captures or contains one or more map points from such frames and/or such one or more map points are added to a sliding window of poses associated with such frames. For example, at block 412, if the map slice 408 contains one or more map points corresponding to frame 402A and such one or more map points are added to a sliding window of poses associated with frame 402A and/or any other of the stored frames 402, the tracking frontend system 102 can then delete the frame 402A from the stored frames 402. Since the map slice 408 contains map points and/or pose information for frame 402A, it may be unnecessary to maintain a stored copy of frame 402A. Therefore, the tracking frontend system 102 can delete frame 402A to free up the memory or space used by the frame 402A.

In other cases, at block 414, the tracking frontend system 102 can delete the frame 402A if none of the map points associated with frame 402A are visible to the device (e.g., visible to an image sensor on the device, visible to a user from the location of the device, etc.) from the device's current location. For example, if the device has moved locations and the map points associated with frame 402A are no longer relevant to the device (e.g., not visible to the device or an associated user from the device's location), then the tracking frontend system 102 can delete the frame 402A is the mapping data associated with frame 402A is no longer useful, relevant, or necessary.

Figure 5:
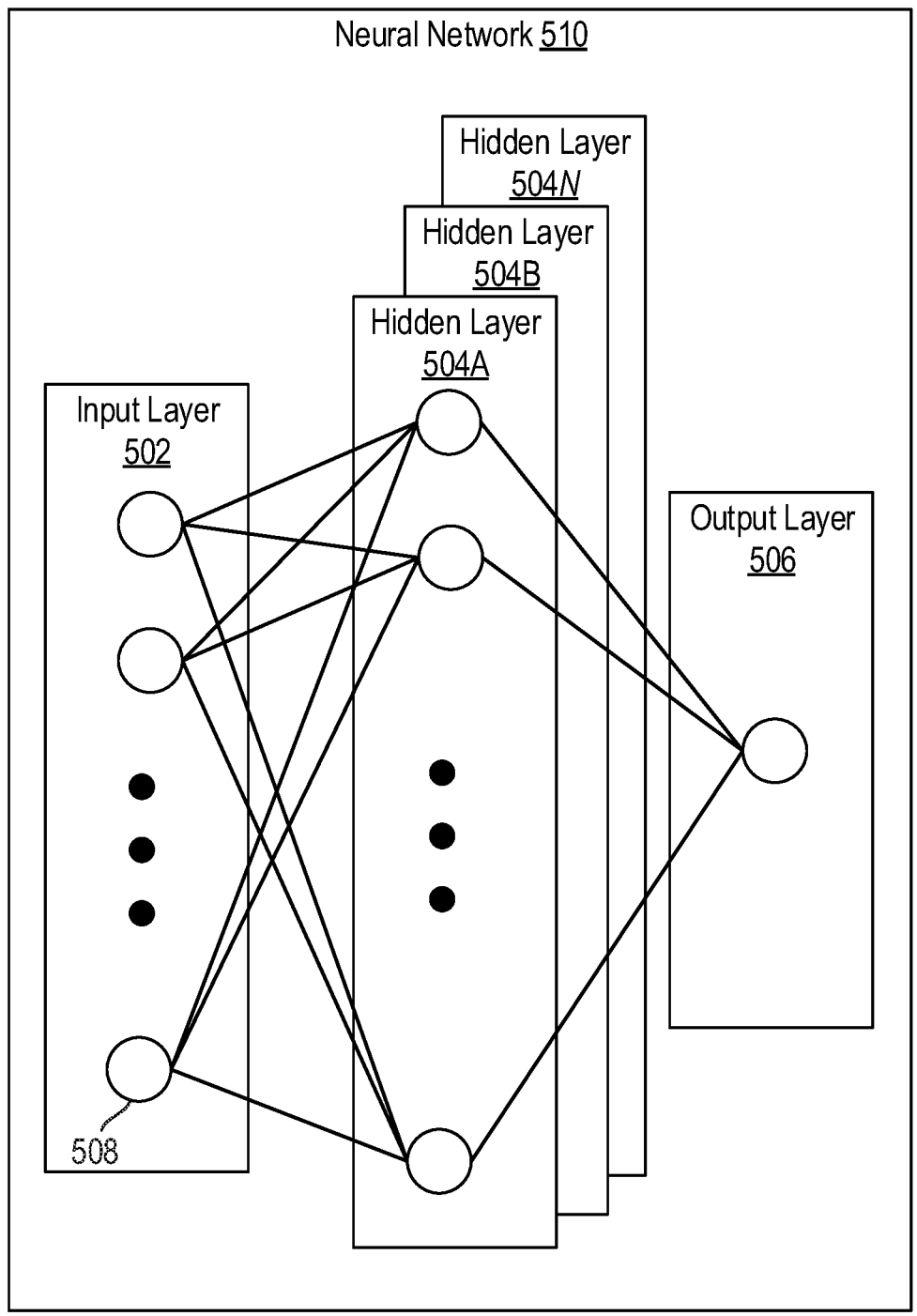
FIG. 5 illustrates an example configuration of a neural network that can be implemented by a tracking frontend system to model a motion of a device and predict a future pose of the device and/or a user associated with the device, in accordance with some examples.

FIG. 5 illustrates an example configuration 500 of a neural network 510 that can be implemented by the tracking frontend system 102 (e.g., via the tracking engine 104, the motion modeling engine 106, the pose estimation engine 108, the mapping engine 110, etc.) to model or predict a motion of the device, predict the device's pose in the future, etc. In this example, the neural network 510 includes an input layer 502 which includes input data, such as one or more frames, sensor measurements (e.g., IMU measurements), device movement data or statistics, etc. The frames can capture a view, scene, environment, or snapshot of a scene; the sensor measurements can capture a measured position and/or motion of the device, and the device movement data or statistics can capture a history or sequence of device movements.

The neural network 510 includes hidden layers 504A through 504N (collectively "504" hereinafter). The hidden layers 504 can include n number of hidden layers, where n is an integer greater than or equal to one. The number of hidden layers can be made to include as many layers as needed for the given application. The neural network 510 further includes an output layer 506 that provides an output resulting from the processing performed by the hidden layers 504. In one illustrative example, the output layer 506 can provide a localization or predicted pose for a device associated with the input data. The localization or predicted pose can include a bounding box indicating the location of the device within a view or map.

The neural network 510 is a multi-layer deep learning network of interconnected nodes. Each node can represent a piece of information. Information associated with the nodes is shared among the different layers and each layer retains information as information is processed. In some cases, the neural network 510 can include a feed-forward network, in which case there are no feedback connections where outputs of the network are fed back into itself. In some cases, the neural network 510 can include a recurrent neural network, which can have loops that allow information to be carried across nodes while reading in input.

Information can be exchanged between nodes through node-to-node interconnections between the various layers. Nodes of the input layer 502 can activate a set of nodes in the first hidden layer 504A. For example, as shown, each of the input nodes of the input layer 502 is connected to each of the nodes of the first hidden layer 504A. The nodes of the hidden layer 504A can transform the information of each input node by applying activation functions to the information. The information derived from the transformation can then be passed to and can activate the nodes of the next hidden layer (e.g., 504B), which can perform their own designated functions. Example functions include convolutional, up-sampling, data transformation, pooling, and/or any other suitable functions. The output of the hidden layer (e.g., 504B) can then activate nodes of the next hidden layer (e.g., 504N), and so on. The output of the last hidden layer can activate one or more nodes of the output layer 506, at which point an output is provided. In some cases, while nodes (e.g., node 508) in the neural network 510 are shown as having multiple output lines, a node has a single output and all lines shown as being output from a node represent the same output value.

In some cases, each node or interconnection between nodes can have a weight that is a set of parameters derived from the training of the neural network 510. For example, an interconnection between nodes can represent a piece of information learned about the interconnected nodes. The interconnection can have a numeric weight that can be tuned (e.g., based on a training dataset), allowing the neural network 510 to be adaptive to inputs and able to learn as more data is processed.

The neural network 510 can be pre-trained to process the features from the data in the input layer 502 using the different hidden layers 504 in order to provide the output through the output layer 506. In an example in which the neural network 510 is used to predict a pose, the neural network 510 can be trained using training data that includes images, sensor measurements, and/or device movement data. In some cases, the neural network 510 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training data until the neural network 510 is trained enough so that the weights of the layers are accurately tuned.

For the example of predicting a pose, the forward pass can include passing training data to the neural network 510. The weights can be initially randomized before the neural network 510 is trained. The training data can include, for example, sensor measurements such as location measurements, velocity, motion dynamics, etc.

For a first training iteration for the neural network 510, the output can include values that do not give preference to any particular result due to the weights being randomly selected at initialization. For example, if the output is a vector with probabilities for different poses, the probability value for each of the different poses may be equal or at least very similar (e.g., for ten poses, each pose may have a probability value of 0.1). With the initial weights, the neural network 510 may be unable to make an accurate determination of a pose. A loss function can be used to analyze errors in the output. Any suitable loss function definition can be used.

The loss (or error) can be high for the first training data since the actual values will be different than the predicted output. The goal of training is to minimize the amount of loss so that the predicted output is the same as the training value(s). The neural network 510 can perform a backward pass by determining which inputs (weights) most contributed to the loss of the network, and can adjust the weights so that the loss decreases and is eventually minimized.

A derivative of the loss with respect to the weights can be computed to determine the weights that contributed most to the loss of the network. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 510 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 510 can represent any other deep network other than a CNN, such as an autoencoder, a deep belief nets (DBNs), a Recurrent Neural Networks (RNNs), etc.

Figure 6:
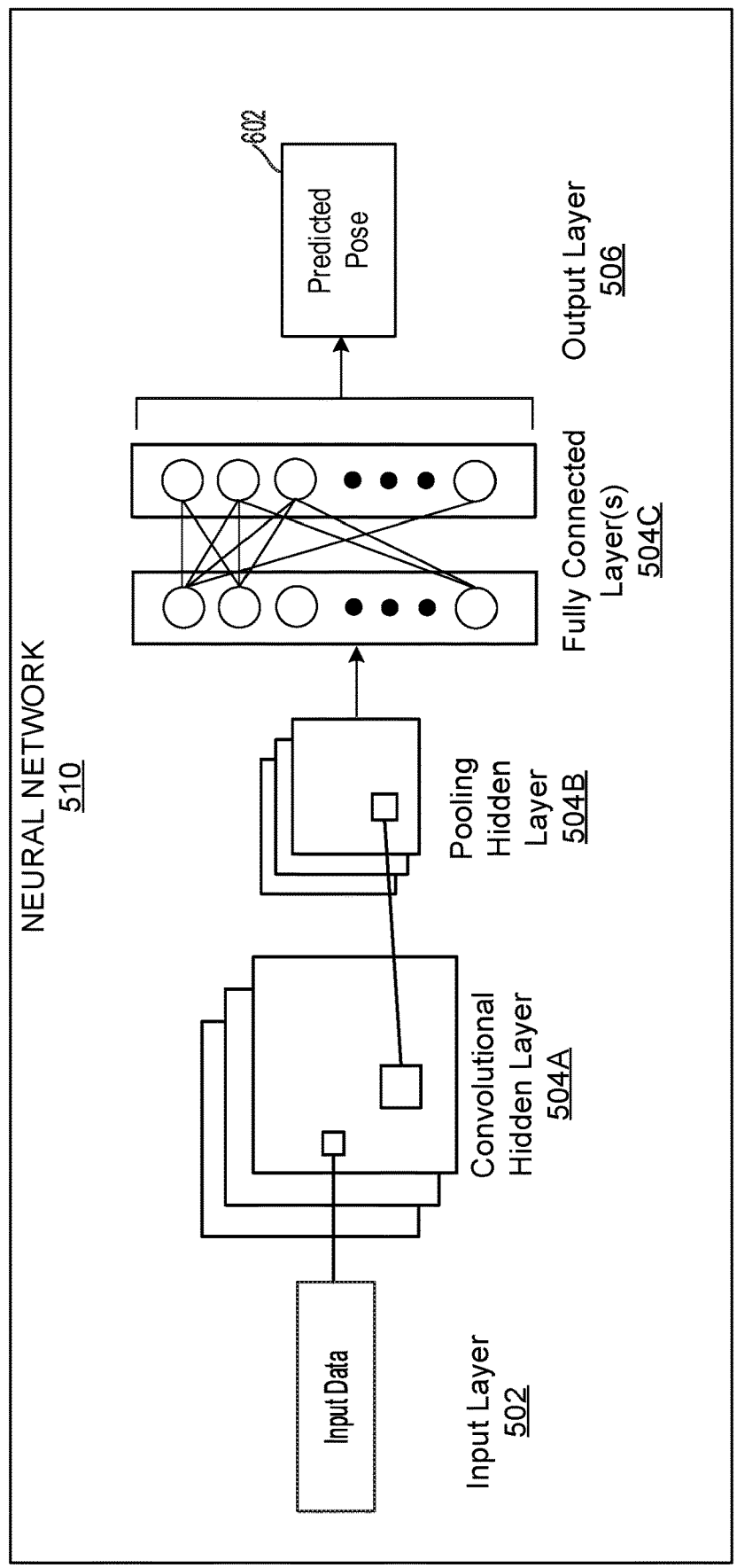
FIG. 6 illustrates an example use of a neural network configured to perform deep learning for predicting a pose, in accordance with some examples.

FIG. 6 illustrates an example use of neural network 510 configured to perform deep learning. In this example, the neural network 510 includes an input layer 502, a convolutional hidden layer 504A, a pooling hidden layer 504B, fully connected layers 504C, and output layer 506. The neural network 510 can predict a future pose of a device. First, each value in the input data is considered as a neuron that has learnable weights and biases. Each neuron receives some inputs, performs a dot product and optionally follows it with a non-linearity function. The neural network 510 can also encode certain properties into the architecture by expressing a single differentiable score function from the input values on one end to scores at the other to ascertain specific pose values. After identifying specific pose values, the neural network 510 can generate a mean score (or z-score) of each and take the average of the scores within the user-defined buffer.

In some examples, the input layer 504A includes sensor data (e.g., 122, 202) and network latency data or statistics. For example, the sensor data can include IMU measurements and/or image data including an array of numbers representing the pixels of an image, with each number in the array including a value from 0 to 255 describing the pixel intensity at that position in the array. The network latency data can include a RTT or round-trip delay calculated or tracked for communications between the tracking frontend system 102 and the mapping backend system 150. The network latency values can be used to determine how far into the future to predict a pose for the device. The sensor data and network latency data can be passed through the convolutional hidden layer 504A, an optional non-linear activation layer, a pooling hidden layer 504B, and fully connected hidden layers 506 to get an output at the output layer 506. The output 602 can indicate a pose or a probability of pose values that best describes the pose obtained for a device associated with the sensor data.

The convolutional hidden layer 504A can analyze the sensor data and network latency data of the input layer 502A. Each node of the convolutional hidden layer 504A can be connected to a region of nodes (pixels, sensor measurement values, network latency values) of the input data. The convolutional hidden layer 504A can be considered as one or more filters (each filter corresponding to a different activation or feature map), with each convolutional iteration of a filter being a node or neuron of the convolutional hidden layer 504A. Each connection between a node and a receptive field (region of nodes (pixels or sensor measurement values)) for that node learns a weight and, in some cases, an overall bias such that each node learns to analyze its particular local receptive field in the input data.

The convolutional nature of the convolutional hidden layer 504A is due to each node of the convolutional layer being applied to its corresponding receptive field. For example, a filter of the convolutional hidden layer 504A can begin in the top-left corner of the input data array and can convolve around the input data. As noted above, each convolutional iteration of the filter can be considered a node or neuron of the convolutional hidden layer 504A. At each convolutional iteration, the values of the filter are multiplied with a corresponding number of the original values of the input data. The multiplications from each convolutional iteration can be summed together to obtain a total sum for that iteration or node. The process is next continued at a next location in the input data according to the receptive field of a next node in the convolutional hidden layer 504A. Processing the filter at each unique location of the input volume produces a number representing the filter results for that location, resulting in a total sum value being determined for each node of the convolutional hidden layer 504A.

The mapping from the input layer 502 to the convolutional hidden layer 504A can be referred to as an activation map (or feature map). The activation map includes a value for each node representing the filter results at each locations of the input volume. The activation map can include an array that includes the various total sum values resulting from each iteration of the filter on the input volume. The convolutional hidden layer 504A can include several activation maps in order to estimate pose values in the input data. The example shown in FIG. 6 includes three activation maps. Using three activation maps, the convolutional hidden layer 504A can detect three different poses or pose values.

In some examples, a non-linear hidden layer can be applied after the convolutional hidden layer 504A. The non-linear layer can be used to introduce non-linearity to a system that has been computing linear operations.

The pooling hidden layer 504B can be applied after the convolutional hidden layer 504A (and after the non-linear hidden layer when used). The pooling hidden layer 504B is used to simplify the information in the output from the convolutional hidden layer 504A. For example, the pooling hidden layer 504B can take each activation map output from the convolutional hidden layer 504A and generate a condensed activation map (or feature map) using a pooling function. Max-pooling is one example of a function performed by a pooling hidden layer. Other forms of pooling functions be used by the pooling hidden layer 504B, such as average pooling or other suitable pooling functions. A pooling function (e.g., a max-pooling filter) is applied to each activation map included in the convolutional hidden layer 504A. In the example shown in FIG. 6, three pooling filters are used for the three activation maps in the convolutional hidden layer 504A.

The pooling function (e.g., max-pooling) can determine whether a given feature or value is found in the input data. Max-pooling (as well as other pooling methods) offer the benefit that there are fewer pooled features, thus reducing the number of parameters needed in later layers.

The fully connected layer 504C can connect every node from the pooling hidden layer 504B to every output node in the output layer 506. The fully connected layer 504C can obtain the output of the previous pooling layer 504B (which should represent the activation maps of high-level features) and determine the pose values that correlate to the input data. For example, the fully connected layer 504C layer can determine the predicted pose values that most strongly correlate to particular sensor data, and can include weights (nodes) for the predicted pose values. A product can be computed between the weights of the fully connected layer 504C and the pooling hidden layer 504B to obtain probabilities for the different classes.

In some examples, the output from the output layer 506 can include an n-dimensional vector, where n can include the number of pose values that the program has to choose from when predicting a pose. Other example outputs can also be provided. Each number in the n-dimensional vector can represent the probability of a predicted pose.

Figure 7:
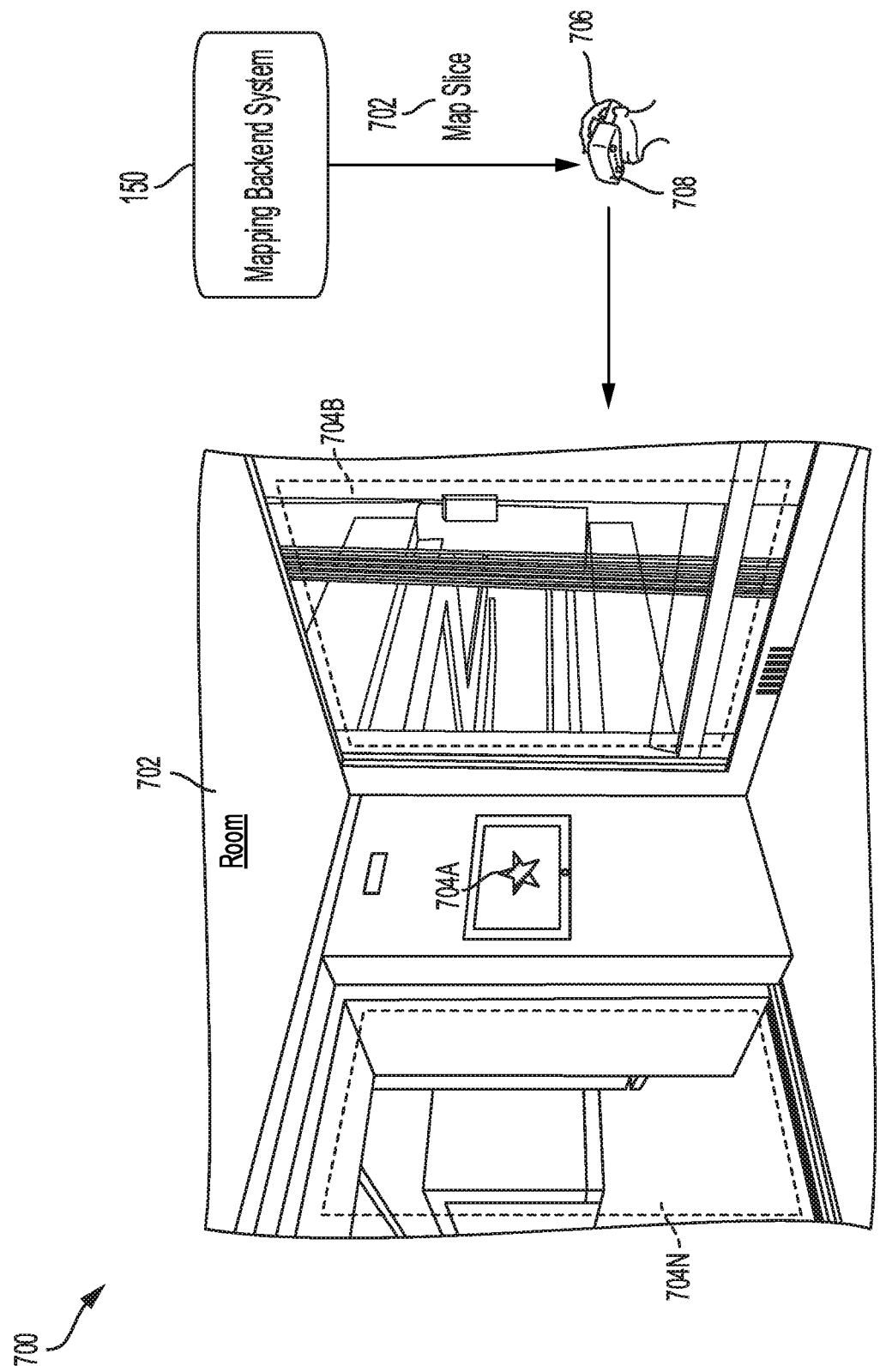
FIG. 7 illustrates an example representation of a map slice generated by a mapping backend system for a scene, in accordance with some examples.

FIG. 7 illustrates an example representation 700 of a map slice 702 generated by the mapping backend system 150 for a scene. In this example, the scene is a room and the map slice 702 corresponds to an area or region in the room that is visible by a user 706 wearing an HMD device 708. The map slice 702 depicts various features 704A-N detected or identified in the corresponding area or region of the room, which are visible by the user 706 from the user's location.

The features 704A-N can include visual features in the area or region of the room. For example, the features 704A-N can include a feature 704A representing a television in the room, a feature 704B representing a window in the room, and a feature 704N representing a door in the room. The features 704A-N can correspond to specific map points represented by the map slice 702.

In this example, the HMD device 708 can implement the frontend tracking system 102. The HMD device 708 can receive the map slice 702 from the mapping backend system 150. Moreover, the pose of the HMD device 708 worn by the user 706 can be tracked based on the map slice 702. For example, the pose of the HMD device 708 worn by the user 706 can be tracked based on the features 704A-N and/or map points associated with the map slice 702. In some examples, the tracking frontend system 102 implemented by the HMD device 708 can track the pose of the HMD device 708 worn by the user 706 based on the map slice 702, data from sensors 130 (e.g., image data or frames, IMU measurements, etc.), and/or previous pose information computed for the device 708. In some cases, the features 704A-N can also be tracked from map points in the map slice 702. To track the HMD device 708 when the HMD device 708 moves out of range or visibility from the area or region in the room captured by the map slice 702, the tracking frontend system 150 can obtain a new or updated map slice from the mapping backend system 150.

In some cases, as previously explained, depending on the amount of movement by the HMD device 708 worn by the user 706 and/or the network latency and associated delay in receiving the new or updated map slice, the tracking frontend system 102 can instead, or in addition, track the HMD device 708 based on a local map maintained at the tracking frontend system 102, such as a sparse map, and/or a sliding window of poses stored or cached by the tracking frontend system 102. In other examples, the tracking frontend system 102 can use the map points of the map slice 702 and/or a local map (e.g., a sparse map) on the tracking frontend system 102 to create or supplement a map or map slice used by the tracking frontend system 102 to track the HMD device 708.

Having disclosed various system components and concepts, the disclosure now turns to the example methods 800, 820 for split tracking, mapping, and 6DoF pose prediction, as shown in FIGS. 8A and 8B. For the sake of clarity, the methods 800, 820 are described in terms of the tracking frontend system 102 and the mapping backend system 150, as shown in FIG. 1, configured to perform the various steps. The steps outlined herein are non-limiting examples provided for illustration purposes, and can be implemented in any combination thereof, including combinations that exclude, add, or modify certain steps.

At step 802, the tracking frontend system 102 computes a predicted pose (e.g., predicted pose 222B) of a device (e.g., HMD device 708) at a future time. The future time can be determined based on a communication latency (e.g., RTT or round-trip delay) between the tracking frontend system 102 and the mapping backend system 150. For example, if the tracking frontend system 102 determines that the communication latency is 150 ms, the predicted pose can be computed for 150 ms into the future. In some examples, additional time can be included to account for other delays, such as jitter or additional processing delays, and/or as a buffer for potential delays beyond the communication latency. By calculating the predicted pose for a future time that depends on, or corresponds to, the communication delay, the method 800 can ensure or help ensure that the predicted pose is current, accurate, and/or relevant when it is received by the tracking frontend system 102.

In some examples, the tracking frontend system 102 can compute the predicted pose using a neural network, such as neural network 510 shown in FIGS. 5 and 6. Moreover, in some cases, the tracking frontend system 102 can compute the predicted pose based on, for example, sensor data (e.g., 122, 202) associated with a device and/or a scene, such as IMU measurements, images or frames, etc.; a model or prediction of a motion of a device; mapping data (e.g., a map slice, a sparse map, a full map, etc.) at the tracking frontend system 102; previous pose information; communication latency information; etc. For example, in some cases, the tracking frontend system 102 can compute the predicted pose based on a model of the a motion of the device, IMU measurements (e.g., captured by IMU sensor 130A), one or more frames captured by an image sensor (e.g., 130B), and/or an indication of a communication latency between the tracking frontend system 102 and the mapping backend system 150. Here, the communication latency can be used to determine a future time for which to predict the pose or project the state estimates.

In some implementations, to compute the predicted pose, the tracking frontend system 102 can obtain one or more sensor measurements from one or more sensors (e.g., sensors 130), and compute the predicted pose of the device at the future time based on the one or more sensor measurements and an amount of time corresponding to the communication latency between the tracking frontend system 102 and the mapping backend system 150. The amount of time can be added to a current time to determine the future time for the predicted pose. In some cases, the one or more sensor measurements can include motion parameters (e.g., speed, trajectory, inertia, position, acceleration, altitude, proximity, etc.) associated with the device. Moreover, in some cases, the tracking frontend system 102 can track a set of features from one or more frames capturing at least a portion of a scene, based on the one or more sensor measurements.

At step 804, the tracking frontend system 102 can send, to the mapping backend system 150, the predicted pose of the device. The tracking frontend system 102 can send the predicted pose of the device to the mapping backend system 150 for use by the mapping backend system 150 in calculating a map slice for the tracking frontend system 102. In some implementations, the tracking frontend system 102 can send a predicted pose of the device at specific intervals, such as every time the tracking frontend system 102 obtains one or more frames associated with a scene of the device and/or a location of the device.

In some cases, the tracking frontend system 102 can also send a set of frames (e.g., 222A) to the mapping backend system 150, which the mapping backend system 150 can add to a list of frames maintained by the mapping backend system 150 for generating maps and/or map slices. The tracking frontend system 102 can send the set of frames at specific intervals. For example, the tracking frontend system 150 can send the set of frames each time the tracking frontend system 150 obtains or captures a certain number of frames. The set of frames can capture at least a portion (e.g., an area or region, a snapshot, etc.) of a scene associated with the device, such as a scene where the device is located.

The set of frames can include one or more frames captured by an image sensor (e.g., 130B) and selected as candidate frames for mapping based on a selection strategy as previously explained. In some cases, the set of frames can be a subset of the plurality of frames, such as a sample or subsample of the plurality of frames that provides a snapshot, view, or depiction of at least a portion of the scene associated with the device. In some examples, the set of frames can include non-overlapping frames selected from a group of frames capturing at least a portion of the scene.

In some examples, the tracking frontend system 102 can select the set of frames based on the predicted pose of the device and/or observations of a plurality of frames (e.g., corresponding features, captured portions of the scene, characteristics of the frames, etc.). The selected set of frames can provide a snapshot of the scene (or an area or region in the scene) associated with the device.

At step 806, the tracking frontend system 102 can receive, from the mapping backend system 150, a map slice (e.g., 236, 702) including a subset of map points corresponding to the scene associated with the device, the map slice being generated based on the predicted pose of the device. The subset of map points can correspond to, for example, an area within the scene where the device is predicted to be at the future time and/or an area within the scene that is (or is estimated to be) visible to the device (e.g., within the field of view of an image sensor on the device, within a field of view of a user associated with the device, etc.) from the device's location at the future time. In some examples, each of the subset of map points can represent a feature at a three-dimensional location within the scene. Moreover, in some cases, the map slice can include a portion of a map (e.g., a full or dense map) of the scene associated with the device, and the subset of map points can include a subset of a plurality of map points in the map of the scene associated with the device.

In some cases, the mapping backend system 150 can create a full map of the scene and provide the tracking frontend system 102 a slice (e.g., a segment, region, portion, area, subset, etc.) of the full map. The slice can be selected by the mapping backend system 150 based on where the device is expected to be located (or have visibility to) at the future time. In other cases, the mapping backend system 150 may only generate the map slice without necessarily generating a full map of the scene. In some implementations, the map slice can include one or more frames associated with the map slice (e.g., the set of frames, one or more non-overlapping frames used to generate the map slice, etc.) and/or metadata associated with a set of frames.

In some cases, in lieu of, or in addition to, sending the map slice to the tracking frontend system 102, the mapping backend system 150 can send a reduced set of data such as, for example, a set of features from a map or map slice, where each feature can include observations of one or more map points, an extracted image patch, a map point identifier, a 3D location, etc. In some examples, the reduced set of data can also include modified frame poses and/or other map update information such as dropped frames, observations, map points, etc.

Moreover, in some examples, when creating a map or map slice, the mapping backend system 150 can perform one or more operations to improve or increase the quality and/or accuracy of the map or map slice created. For example, the mapping backend system 150 can perform bundle adjustment, map densification, loop closure, etc., in order to improve or increase the quality and/or accuracy of the map or map slice created.

At step 808, the tracking frontend system 102 can compute an updated pose of the device based at least partly on the map slice. In some examples, the tracking frontend system 102 can compute the updated pose of the device using map points and/or features in the map slice. In other examples, the tracking frontend system 102 can also use other data to compute the updated pose of the device, such as, for example, IMU measurements, one or more frames capturing at least a portion of the scene and/or an area where the device is located, previous pose information, previous mapping data, etc.

The tracking frontend system 102 can use the map slice from the mapping backend system 150 to track the position of the device and/or any other objects, users, or features in the scene. The tracking frontend system 102 can continue obtaining new or updated map slices from the mapping backend system 150 to account for the device moving from one location to another. For example, when the tracking frontend system 102 wants new or updated mapping data, the tracking frontend system 102 can send, to the mapping backend system 150, a new set of frames, a new set of map points, a list or set of tracked map points, and/or a list or set of poses associated with the device; and thereafter receive, from the mapping backend system 150, a new (or updated) map slice generated based on the predicted pose, the new set of frames, the new set of map points, the list or set of tracked map points, and/or the list or set of poses associated with the device.

In some cases, the tracking frontend system 102 can send a new set of frames and/or a new set of map points at specific intervals. For example, the tracking frontend system 102 can send a new set of frames and/or a new set of map points at every few frames (e.g., a certain number of frames). Similarly, in some cases, the tracking frontend system 102 can send a list or set of tracked map points and/or a list or set of poses at specific intervals. For example, the tracking frontend system 102 can send a list or set of tracked map points and/or a list or set of poses at every frame.

In some implementations, to compute the predicted pose, the tracking frontend system 102 can obtain one or more sensor measurements from one or more sensors (e.g., sensors 130), and compute the predicted pose of the device at the future time based on the one or more sensor measurements and an amount of time corresponding to the communication latency between the tracking frontend system 102 and the mapping backend system 150. The amount of time can be added to a current time to determine the future time for the predicted pose.

In some cases, the one or more sensor measurements can include motion parameters (e.g., speed, trajectory, inertia, position, acceleration, altitude, proximity, etc.) associated with the device. In some cases, the tracking frontend system 102 can track a set of features from one or more frames (e.g., one or more of the set of frames and/or the plurality of frames) based on one or more sensor measurements (e.g., IMU measurements, image data, etc.), and computing the updated pose of the device based on the set of features tracked.

In some aspects, when a number of map slice features determined to be relevant to a current location of the device is below a threshold, the tracking frontend system 102 can compute the updated pose of the device based at least partly on a local sparse map (e.g., 220) having a lower feature density than the map slice. The sparse map can include, for example, a subset of features detected and stored by the tracking frontend system 102, and a subset of features obtained by the tracking frontend system 102 from one or more map slices generated by the mapping backend system 150, etc.

The map slice features can be determined to be relevant to the current location of the device when the map slice features are visible from the current location of the device, within a proximity of the current location of the device, associated with the current location of the device (e.g., when the device is disposed within a scene corresponding to the map slice features), etc. In some cases, the tracking frontend system 102 can use one or more features or map points from the sparse map to supplement or update the map slice from the mapping backend system 150, or vice versa.

In some cases, the tracking frontend system 102 can store a variable length sliding window of poses associated with the device for use in tracking the position of the device when enough (or any) accurate or relevant map points are not available (or receipt of them is delayed) to the tracking frontend system 102. The tracking frontend system 102 can then compute the updated pose of the device based at least partly on the variable length sliding window of poses. In some implementations, the length of the variable length sliding window of poses can be determined based on the communication latency (e.g., RTT or round-trip delay) of map slice communications between the tracking frontend system 102 and the mapping backend system 150.

In some cases, the tracking frontend system 102 can compute the updated pose of the device based at least partly on the variable length sliding window of poses when the communication latency (e.g., the RTT or the round-trip delay) exceeds a threshold (e.g., a threshold amount of time); when a movement by the device exceeds a threshold (e.g., a threshold amount or frequency of movement by the device); when a number of map slice features, such as a number of map slice features determined to be relevant to a current location of the device, is below a threshold, etc.

FIG. 8B illustrates another example method 820 for split tracking and mapping. At step 820, the mapping backend system 150 receives, from the tracking frontend system 102, a predicted pose (e.g., 222B) of a device corresponding to a future time. The future time can be determined based on a communication latency (e.g., RTT or round-trip delay) between the tracking frontend system 102 and the mapping backend system 150. In some examples, additional time can be included in the future time to account for other delays, such as jitter or additional processing delays, and/or as a buffer for potential delays beyond the communication latency.

At step 822, the mapping backend system 150 can receive, from the tracking frontend system 102, a predicted pose of a device (e.g., the tracking frontend system 102) corresponding to a future time. In some cases, at step 824, the mapping backend system 150 can also receive a set of frames from the tracking frontend system 102. The set of frames can include one or more frames captured by an image sensor (e.g., 130B) and selected as candidate frames for mapping based on a selection strategy as previously explained. In some cases, the set of frames can be a subset of the sequence of frames, such as a sample or subsample of the sequence of frames that provides a snapshot, view, or depiction of at least a portion of the scene associated with the device. In some examples, the set of frames can include non-overlapping frames selected from a group of frames capturing at least a portion of the scene.

In some cases, the set of frames can include one or more frames selected based on the predicted pose of the device and/or observations of the sequence of frames (e.g., corresponding features, captured portions of the scene, characteristics of the frames, etc.). The selected set of frames can provide a snapshot of the scene (or an area or region in the scene) associated with the device.

At step 826, the mapping backend system 150 can generate a map slice (e.g., 236, 702) including a subset of map points within a scene associated with the device, the map slice being generated based on the predicted pose of the device. In some cases, the map slice can also be generated further based on one or more of the set of frames. The subset of map points can correspond to the predicted pose. In some cases, the subset of map points can also correspond to an area or region in a map of the scene and/or an area or region in a scene where the device is predicted to be at the future time.

In some cases, the mapping backend system 150 can create a full map of the scene and provide the tracking frontend system 102 a slice (e.g., a segment, region, portion, area, subset, etc.) of the full map, as further described below in step 826. The slice can be selected by the mapping backend system 150 based on where the device is expected to be located (or have visibility to) at the future time. In other cases, the mapping backend system 150 may only generate the map slice without necessarily generating a full map of the scene. In some implementations, the map slice can include one or more frames associated with the map slice (e.g., the set of frames, one or more non-overlapping frames used to generate the map slice, etc.) and/or metadata associated with the set of frames.

Moreover, in some examples, when creating a map or map slice, the mapping backend system 150 can perform one or more operations to improve or increase the quality and/or accuracy of the map or map slice created. For example, the mapping backend system 150 can perform bundle adjustment, map densification, loop closure, etc., in order to improve or increase the quality and/or accuracy of the map or map slice created.

At step 828, the mapping backend system 150 can send the map slice to the tracking frontend system 102, which the tracking frontend system 102 can use to track the position of the device and/or provide an XR experience to the user as previously described.

The set of frames can include overlapping and/or non-overlapping frames. In some cases, the mapping backend system 150 can identify non-overlapping frames from the set of frames, and generate the map slice based on the non-overlapping frames and the predicted pose of the device.

In some cases, the mapping backend system 150 can receive a new set of frames and a new predicted pose from the tracking frontend system 102, and generate a new or updated map slice based on the new set of frames and the new predicted pose. The mapping backend system 150 can then send the new or updated map slice to the tracking frontend system 102 for use by the tracking frontend system 102 (e.g., for use in tracking the device, mapping features, updating mapping data, providing XR experiences, etc.).

In some examples, the methods 800 and 820 may be performed by one or more computing devices or an apparatuses. In one illustrative example, the methods 800 and 820 can be performed by the tracking frontend system 102 and the mapping backend system 150 shown in FIG. 1 and/or one or more computing devices with the computing device architecture 900 shown in FIG. 9. In some cases, such a computing device or apparatus may include a processor, microprocessor, microcomputer, or other component of a device that is configured to carry out the steps of methods 800 and 820. In some examples, such computing device or apparatus may include one or more sensors configured to collect sensor measurements. For example, the computing device can include a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensor measurements. Such computing device may further include a network interface configured to communicate data.

The methods 800 and 820 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the methods 800 and 820 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 9 illustrates an example computing device architecture 900 of an example computing device which can implement the various techniques described herein. For example, the computing device architecture 900 can implement the tracking frontend system 102 and/or the mapping backend system 150 shown in FIG. 1, and perform any of the tracking, mapping, and pose prediction techniques described herein. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device, etc. In some instances, multimodal computing devices can enable a user to provide multiple types of input to communicate with the computing device architecture 900. The communications interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include services 932, 934, 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components, computing devices and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
computing, at a client device, a predicted pose of the client device at a future time, the future time being determined based on a communication latency between the client device and a mapping backend system;
sending, to the mapping backend system, the predicted pose of the client device and one or more frames of a scene associated with the client device;
receiving, by the client device from the mapping backend system, a map slice of a map of the scene associated with the client device, the map slice comprising a subset of map points from a plurality of map points in the map of the scene, the map slice being generated based on the predicted pose of the client device, wherein one or more map points of the subset of map points correspond to an area of the scene associated with the predicted pose; and
computing an updated pose of the client device based at least partly on the map slice.

2. The method of claim 1, wherein the future time is determined based on an amount of time associated with the communication latency and an additional amount of buffer time, the method further comprising:
adjusting a previous amount of buffer time based on the amount of time associated with the communication latency, wherein the additional amount of buffer time comprises the adjusted previous amount of buffer time.

3. The method of claim 1, wherein each map point of the subset of map points represents a feature at a three-dimensional location within the scene, and wherein the predicted pose is computed by the client device using a neural network.

4. The method of claim 1, further comprising:
obtaining, by the client device, one or more sensor measurements from one or more sensors, the one or more sensor measurements comprising motion parameters associated with the client device; and
computing the predicted pose of the client device at the future time based on the one or more sensor measurements and an amount of time corresponding to the communication latency between the client device and the mapping backend system.

5. The method of claim 4, further comprising calculating a motion of the client device, wherein computing the predicted pose of the client device at the future time is further based on the motion of the client device.

6. The method of claim 4, further comprising tracking a set of features from a plurality of frames based on the one or more sensor measurements, wherein computing the updated pose of the client device is further based on the set of features from the plurality of frames.

7. The method of claim 4, wherein the client device comprises a head-mounted display, the head-mounted display comprising the one or more sensors, the one or more sensors comprising at least one of an image sensor and an inertial measurement unit.

8. The method of claim 1, further comprising:
sending, by the client device to the mapping backend system, a set of frames and map points after every number of frames obtained by the client device;
sending, by the client device to the mapping backend system, a set of tracked map points and pose information associated with the client device, the set of tracked map points and the pose information being sent after every frame from a plurality of frames obtained by the client device; and
receiving, by the client device from the mapping backend system, a new map slice generated based on at least one of an additional map maintained by the mapping backend system, the set of frames, the map points, the set of tracked map points, and the pose information associated with the client device.

9. The method of claim 1, wherein the map slice comprises non-overlapping frames selected from a group of frames capturing at least a portion of the scene.

10. The method of claim 1, further comprising:
computing, by the client device, the updated pose of the client device based at least partly on a local map, the local map comprising at least one of a first feature stored by the client device and a second feature from one or more map slices received from the mapping backend system.

11. The method of claim 10, further comprising supplementing the map slice with one or more features from the local map.

12. The method of claim 1, further comprising:
determining a length of a variable length sliding window of poses associated with the client device, wherein the length of the variable length sliding window of poses is based on a round-trip delay of map slice communications between the client device and the mapping backend system.

13. The method of claim 12, further comprising:
computing, by the client device, the updated pose of the client device based at least partly on the variable length sliding window of poses.

14. The method of claim 13, wherein the updated pose of the client device is computed based at least partly on the variable length sliding window of poses when at least one of the round-trip delay exceeds a first threshold, a movement by the client device exceeds a second threshold, and a number of map slice features is below a third threshold.

15. An apparatus comprising:
a memory; and
a processor coupled to the memory, the processor configured to:
compute a predicted pose of the apparatus at a future time, the future time being determined based on a communication latency between the apparatus and a mapping backend system;
send, to the mapping backend system, the predicted pose of the apparatus;
receive, from the mapping backend system, a map slice of a map of a scene associated with the apparatus, the map slice comprising a subset of map points from a plurality of map points in the map of the scene, the map slice being generated based on the predicted pose of the apparatus, wherein one or more map points of the subset of map points correspond to an area of the scene associated with the predicted pose; and
compute an updated pose of the apparatus based at least partly on the map slice.

16. The apparatus of claim 15, wherein the future time is determined based on an amount of time associated with the communication latency and an additional amount of buffer time, wherein the processor is configured to:
adjust a previous amount of buffer time based on the amount of time associated with the communication latency, wherein the additional amount of buffer time comprises the adjusted previous amount of buffer time.

17. The apparatus of claim 15, wherein each map point of the subset of map points represents a feature at a three-dimensional location within the scene, and wherein the predicted pose is computed by the apparatus using a neural network.

18. The apparatus of claim 15, wherein the processor is configured to:
obtain one or more sensor measurements from one or more sensors, the one or more sensor measurements comprising motion parameters associated with the apparatus; and
compute the predicted pose of the apparatus at the future time based on the one or more sensor measurements and an amount of time corresponding to the communication latency between the apparatus and the mapping backend system.

19. The apparatus of claim 18, wherein the processor is configured to calculate a motion of the apparatus, wherein computing the predicted pose of the apparatus at the future time is further based on the motion of the apparatus.

20. The apparatus of claim 18, wherein the processor is configured to track a set of features from a plurality of frames based on the one or more sensor measurements, wherein computing the updated pose of the apparatus is further based on the set of features from the plurality of frames.

21. The apparatus of claim 15, further comprising at least one of a head-mounted display and one or more sensors, the one or more sensors comprising at least one of an image sensor and an inertial measurement unit.

22. The apparatus of claim 15, further comprising a mobile device.

23. The apparatus of claim 15, wherein the processor is configured to:
send, to the mapping backend system, a set of frames and map points after every number of frames obtained by the apparatus;
send, to the mapping backend system, a set of tracked map points and pose information associated with the apparatus, the set of tracked map points and the pose information being sent after every frame from a plurality of frames obtained by the apparatus; and
receive, from the mapping backend system, a new map slice generated based on at least one of an additional map maintained by the mapping backend system, the set of frames, the map points, the set of tracked map points, and the pose information associated with the apparatus.

24. The apparatus of claim 15, wherein the map slice comprises non-overlapping frames selected from a group of frames capturing at least the portion of the scene.

25. The apparatus of claim 15, wherein the processor is configured to:
compute the updated pose of the apparatus based at least partly on a local map, the local map comprising at least one of a first feature stored by the apparatus and a second feature obtained by the apparatus from one or more map slices generated by the mapping backend system.

26. The apparatus of claim 25, wherein the processor is configured to:
supplement the map slice with one or more features from the local map.

27. The apparatus of claim 15, wherein the processor is configured to:
determine a length of a variable length sliding window of poses associated with the apparatus, the length of the variable length sliding window of poses being determined based on a round-trip delay of map slice communications between the apparatus and the mapping backend system.

28. The apparatus of claim 27, wherein the processor is configured to:
compute the updated pose of the apparatus based at least partly on the variable length sliding window of poses.

29. The apparatus of claim 28, wherein the updated pose of the user is computed based at least partly on the variable length sliding window of poses when at least one of the round-trip delay exceeds a first threshold, a movement by the apparatus exceeds a second threshold, and a number of map slice features is below a third threshold.

30. A non-transitory computer-readable storage medium comprising:
instructions stored thereon which, when executed by one or more processors, cause the one or more processors to:
compute a predicted pose of a device at a future time, the future time being determined based on a communication latency between the device and a mapping backend system;
send, to the mapping backend system, the predicted pose of the device and one or more frames of a scene associated with the device;
receive, from the mapping backend system, a map slice of a map of the scene associated with the device, the map slice comprising a subset of map points from a plurality of map points in the map of the scene, the map slice being generated based on the predicted pose of the client device, wherein one or more map points of the subset of map points correspond to an area of the scene associated with the predicted pose; and
compute an updated pose of the device based at least partly on the map slice.

* * * * *